US008571974B1

(12) United States Patent  
Coleman

(10) Patent No.: US 8,571,974 B1  
(45) Date of Patent: Oct. 29, 2013

(54) METHODS AND SYSTEMS FOR AUTOMATED DATA COLLECTION AND ANALYSIS

(75) Inventor: Donald P. Coleman, Weatherby Lake, MO (US)

(73) Assignee: The PNC Financial Services Group, Inc., Pittsburgh, PA (US)

(*) Notice: Subject to any disclaimer, the term of this patent is extended or adjusted under 35 U.S.C. 154(b) by 0 days.

(21) Appl. No.: 12/140,621

(22) Filed: Jun. 17, 2008

Related U.S. Application Data

(62) Division of application No. 09/998,152, filed on Nov. 30, 2001, now Pat. No. 7,415,471.

(51) Int. Cl.
*G06Q 40/025* (2012.01)
*G06Q 40/08* (2012.01)
*G06Q 40/02* (2012.01)
*G06Q 40/00* (2012.01)
*G06Q 40/04* (2012.01)

(52) U.S. Cl.
USPC ............... 705/38; 705/4; 705/36 R; 705/37; 705/35

(58) Field of Classification Search
CPC ..... G06Q 40/025; G06Q 40/08; G06Q 40/02; G06Q 40/00; G06Q 40/04
USPC ...... 705/36 R, 37, 38, 9, 8, 2, 4, 10, 36, 35 R; 707/100, 695; 713/168, 178; 726/22; 1/1; 715/848
See application file for complete search history.

(56) References Cited

U.S. PATENT DOCUMENTS

| | | | |
|---|---|---|---|
| 4,736,294 A | 4/1988 | Gill et al. | |
| 4,914,587 A | 4/1990 | Clouse | |
| 5,241,466 A | 8/1993 | Perry et al. | |
| 5,283,829 A | 2/1994 | Anderson | |
| 5,323,315 A | 6/1994 | Highbloom | |
| 5,383,113 A | 1/1995 | Kight et al. | |
| 5,465,206 A | 11/1995 | Hilt et al. | |
| 5,483,445 A | 1/1996 | Pickering | |
| 5,544,255 A | 8/1996 | Smithies et al. | |
| 5,550,971 A | 8/1996 | Brunner et al. | |
| 5,557,515 A * | 9/1996 | Abbruzzese et al. | 705/9 |

(Continued)

OTHER PUBLICATIONS

Webster's Revised Unabridged Dictionary (1913+1828), Def. "associate".*

(Continued)

*Primary Examiner* — Barbara Joan Amelunxen
(74) *Attorney, Agent, or Firm* — Buchanan Ingersoll & Rooney PC; Robert J. Pugh

(57) ABSTRACT

A method for processing documents in a database having at least one record therein. Asset-related data contained on at least one document is reviewed pursuant to securitization of multiple assets. The at least one of the multiple assets comprises a commercial mortgage loan. The document is received into the database on a flow basis including receiving information from the document into the database as the document information becomes available for entry into the database. The flow basis includes collecting data from the document independently of an end use of the document. The contents of the document are analyzed to ensure compliance with at least one standard. The output data is provided from the record in the database. The output data includes at least data related to multiple assets associated with a securitization of the multiple assets. System, computer readable memory, and computer readable memory storage embodiments also are provided.

13 Claims, 24 Drawing Sheets

(56) References Cited

U.S. PATENT DOCUMENTS

| | | | |
|---|---|---|---|
| 5,563,783 A * | 10/1996 | Stolfo et al. .............. 705/7.25 |
| 5,615,268 A | 3/1997 | Bisbee et al. |
| 5,629,981 A * | 5/1997 | Nerlikar ....................... 713/168 |
| 5,630,127 A | 5/1997 | Moore et al. |
| 5,649,116 A | 7/1997 | McCoy et al. |
| 5,649,117 A | 7/1997 | Landry |
| 5,673,402 A | 9/1997 | Ryan et al. |
| 5,696,907 A | 12/1997 | Tom |
| 5,699,528 A | 12/1997 | Hogan |
| 5,704,045 A | 12/1997 | King et al. |
| 5,712,960 A | 1/1998 | Chiopris et al. |
| 5,724,577 A | 3/1998 | Exley et al. |
| 5,734,890 A | 3/1998 | Case et al. |
| 5,761,441 A | 6/1998 | Bennett |
| 5,765,144 A | 6/1998 | Larche et al. |
| 5,774,883 A | 6/1998 | Andersen et al. |
| 5,790,260 A | 8/1998 | Myers |
| 5,812,134 A * | 9/1998 | Pooser et al. ................. 715/848 |
| 5,813,009 A * | 9/1998 | Johnson et al. .............. 707/695 |
| 5,832,460 A | 11/1998 | Bednar et al. |
| 5,839,118 A | 11/1998 | Ryan et al. |
| 5,870,721 A | 2/1999 | Norris |
| 5,875,431 A | 2/1999 | Heckman et al. |
| 5,875,437 A | 2/1999 | Atkins |
| 5,884,288 A | 3/1999 | Chang et al. |
| 5,893,079 A | 4/1999 | Cwenar |
| 5,930,759 A | 7/1999 | Moore et al. |
| 5,930,764 A | 7/1999 | Melchione et al. |
| 5,930,778 A | 7/1999 | Geer |
| 5,943,656 A | 8/1999 | Crooks et al. |
| 5,956,700 A | 9/1999 | Landry |
| 5,963,925 A | 10/1999 | Kolling et al. |
| 5,966,700 A * | 10/1999 | Gould et al. ..................... 705/38 |
| 5,978,780 A | 11/1999 | Watson |
| 5,983,206 A * | 11/1999 | Oppenheimer ................ 705/38 |
| 5,987,434 A | 11/1999 | Libman |
| 5,991,750 A | 11/1999 | Watson |
| 5,991,881 A * | 11/1999 | Conklin et al. ................. 726/22 |
| 5,995,947 A * | 11/1999 | Fraser et al. .................... 705/38 |
| 6,012,047 A | 1/2000 | Mazonas |
| 6,016,482 A | 1/2000 | Molinari et al. |
| 6,018,721 A | 1/2000 | Aziz et al. |
| 6,018,723 A | 1/2000 | Siegel et al. |
| 6,021,202 A | 2/2000 | Anderson et al. |
| 6,029,887 A | 2/2000 | Furuhashi et al. |
| 6,032,133 A | 2/2000 | Hilt et al. |
| 6,035,285 A | 3/2000 | Schlect et al. |
| 6,043,819 A | 3/2000 | LeBrun et al. |
| 6,044,362 A | 3/2000 | Neely |
| 6,049,782 A | 4/2000 | Gottesman et al. |
| 6,055,505 A | 4/2000 | Elston |
| 6,070,150 A | 5/2000 | Remington et al. |
| 6,070,151 A | 5/2000 | Frankel |
| 6,076,072 A | 6/2000 | Libman |
| 6,078,905 A | 6/2000 | Pich-LeWinter |
| 6,078,907 A | 6/2000 | Lamm |
| 6,081,790 A | 6/2000 | Rosen |
| 6,105,007 A | 8/2000 | Norris |
| 6,119,103 A | 9/2000 | Basch et al. |
| 6,119,104 A | 9/2000 | Brumbelow et al. |
| 6,119,107 A | 9/2000 | Polk |
| 6,128,599 A | 10/2000 | Walker et al. |
| 6,128,603 A | 10/2000 | Dent et al. |
| 6,131,810 A | 10/2000 | Weiss et al. |
| 6,138,102 A | 10/2000 | Hinckley, Jr. |
| 6,148,293 A | 11/2000 | King |
| 6,161,098 A | 12/2000 | Wallman |
| 6,182,048 B1 | 1/2001 | Osborn et al. |
| 6,185,683 B1 | 2/2001 | Ginter et al. |
| 6,202,053 B1 | 3/2001 | Christiansen et al. |
| 6,205,434 B1 | 3/2001 | Ryan et al. |
| 6,209,095 B1 | 3/2001 | Anderson et al. |
| 6,223,983 B1 | 5/2001 | Kjonaas et al. |
| 6,226,623 B1 | 5/2001 | Schein |
| 6,226,624 B1 | 5/2001 | Watson et al. |
| 6,233,566 B1 * | 5/2001 | Levine et al. ............... 705/36 R |
| 6,237,096 B1 | 5/2001 | Bisbee et al. |
| 6,249,775 B1 | 6/2001 | Freeman |
| 6,266,054 B1 | 7/2001 | Lawton et al. |
| 6,266,666 B1 | 7/2001 | Ireland et al. |
| 6,270,457 B1 | 8/2001 | Bardy |
| 6,275,824 B1 | 8/2001 | O'Flaherty |
| 6,279,008 B1 | 8/2001 | Tung Ng et al. |
| 6,292,788 B1 | 9/2001 | Roberts |
| 6,324,541 B1 | 11/2001 | de l'Etraz et al. |
| 6,345,262 B1 * | 2/2002 | Madden ........................... 705/38 |
| 6,367,013 B1 * | 4/2002 | Bisbee et al. .................. 713/178 |
| 6,389,588 B1 | 5/2002 | Wadhwa |
| 6,460,021 B1 | 10/2002 | Kirksey |
| 6,615,187 B1 | 9/2003 | Ashenmil et al. |
| 6,868,525 B1 | 3/2005 | Szabo |
| 6,904,412 B1 * | 6/2005 | Broadbent et al. .............. 705/38 |
| 7,035,820 B2 | 4/2006 | Goodwin et al. |
| 7,107,239 B2 | 9/2006 | Graff |
| 7,181,422 B1 * | 2/2007 | Philip et al. ................. 705/36 R |
| 7,313,540 B1 * | 12/2007 | Hueler et al. ................ 705/36 R |
| 7,315,841 B1 * | 1/2008 | McDonald et al. ............. 705/38 |
| 7,340,427 B1 * | 3/2008 | Cornell ............................ 705/37 |
| 7,340,433 B1 * | 3/2008 | Kay et al. ........................ 705/38 |
| 7,373,612 B2 | 5/2008 | Risch et al. |
| 7,386,507 B2 * | 6/2008 | Davis et al. .................... 705/38 |
| 7,415,471 B1 * | 8/2008 | Coleman ............................. 1/1 |
| 7,734,484 B2 * | 6/2010 | Lutnick et al. ................... 705/4 |
| 7,783,562 B1 | 8/2010 | Ellis ................................ 705/38 |
| 7,813,944 B1 * | 10/2010 | Luk et al. ......................... 705/4 |
| 2001/0034701 A1 * | 10/2001 | Fox et al. ......................... 705/38 |
| 2001/0037287 A1 * | 11/2001 | Broadbent et al. .............. 705/38 |
| 2001/0047326 A1 * | 11/2001 | Broadbent et al. .............. 705/38 |
| 2002/0002475 A1 * | 1/2002 | Freedman et al. ................ 705/4 |
| 2002/0019804 A1 | 2/2002 | Sutton |
| 2002/0029207 A1 | 3/2002 | Bakalash et al. |
| 2002/0038285 A1 | 3/2002 | Golden et al. |
| 2002/0055905 A1 | 5/2002 | Jannah et al. .................... 705/38 |
| 2002/0072958 A1 | 6/2002 | Yuyama et al. ................. 705/10 |
| 2002/0120474 A1 * | 8/2002 | Hele et al. ........................ 705/4 |
| 2002/0188556 A1 * | 12/2002 | Colica et al. .................... 705/38 |
| 2003/0018558 A1 | 1/2003 | Heffner et al. |
| 2003/0018563 A1 * | 1/2003 | Kilgour et al. .................. 705/37 |
| 2003/0050884 A1 | 3/2003 | Barnett |
| 2003/0110073 A1 | 6/2003 | Briel et al. |
| 2003/0135451 A1 * | 7/2003 | O'Brien et al. ................. 705/38 |
| 2004/0019558 A1 * | 1/2004 | McDonald et al. ............. 705/38 |
| 2004/0236676 A1 * | 11/2004 | Takezawa et al. .............. 705/38 |
| 2005/0010504 A1 | 1/2005 | Gebhard et al. |
| 2005/0102225 A1 * | 5/2005 | Oppenheimer et al. ......... 705/38 |
| 2005/0125259 A1 * | 6/2005 | Annappindi ....................... 705/4 |
| 2005/0273368 A1 * | 12/2005 | Hutten et al. ..................... 705/4 |
| 2007/0027787 A1 * | 2/2007 | Tripp ............................... 705/36 |
| 2007/0067229 A1 | 3/2007 | Parthasarathy |
| 2007/0185743 A1 * | 8/2007 | Jinks ................................ 705/4 |
| 2007/0226015 A1 * | 9/2007 | Lutnick et al. .................... 705/4 |
| 2008/0288418 A1 * | 11/2008 | Weiss et al. ................. 705/36 R |
| 2009/0037228 A1 * | 2/2009 | Engel ................................ 705/4 |
| 2009/0313051 A1 * | 12/2009 | Van Slyke et al. ............... 705/4 |
| 2010/0057538 A1 * | 3/2010 | Hardman et al. ............... 705/10 |
| 2010/0094666 A1 * | 4/2010 | Pendergrass et al. ............ 705/4 |
| 2010/0211405 A1 * | 8/2010 | Lutnick et al. .................... 705/2 |
| 2010/0318383 A1 * | 12/2010 | Hargroder ........................ 705/4 |

OTHER PUBLICATIONS

Anonymous, How to set up a simple model from scratch in Reditus. May 2001. pp. 1-12.*
United States Patent Application No. 10/336,501, filed Jan. 3, 2003.
Office Action issued on Mar. 25, 2004 in U.S. Appl. No. 09/998,152.
Office Action issued on Jan. 21, 2005 in U.S. Appl. No. 09/998,152.
Office Action issued on Sep. 23, 2005 in U.S. Appl. No. 09/998,152.
Office Action issued on Jan. 10, 2007 in U.S. Appl. No. 09/998,152.
Office Action issued on Dec. 12, 2007 in U.S. Appl. No. 09/998,152.
Notice of Allowance issued on Jun. 20, 2008 in U.S. Appl. No. 09/998,152 issued as U.S. Patent No. 7,415,471 B1.
Office Action dated Dec. 6, 2006 in U.S. Appl. No. 10/336,501.
Office Action dated Aug. 30, 2007 in U.S. Appl. No. 10/336,501.

(56) References Cited

OTHER PUBLICATIONS

Office Action dated Oct. 23, 2007 in U.S. Appl. No. 10/336,501.
Office Action dated May 12, 2008 in U.S. Appl. No. 10/336,501.
Office Action dated Jan. 22, 2009 in U.S. Appl. No. 10/336,501.
"SS&C Technologies, Inc.—Markets: Real Estate: Loan Management," printed from http://www.sscinc.com/markets/real_estate/default.asp?P=2, Internet site, accessed on Nov. 27, 2001, 1 page.
"SS&C Technologies, Inc.—LMS: Screen Shots" "Report Screen Shot," printed from http://www.sscinc.com/lms/screen_shots.asp?P=2, Internet site, accessed on Nov. 27, 2001, 1 page.
"SS&C Technologies, Inc.—LMS: Screen Shots" "Investor Reporting Module-Pool Setup," printed from http://www.sscinc.com/lms/screen_shots.asp?P=3, Internet site, accessed on Nov. 27, 2001, 1 page.
"SS&C Technologies, Inc.—LMS: Screen Shots" "Collateral Management," printed from http://www.sscinc.com/lms/screen_shots.asp?P=5, Internet site, accessed on Nov. 27, 2001, 1 page.
"SS&C Technologies, Inc.—LMS: Screen Shots" "SnapShots Screen Shot" printed from http://www.sscinc.com/lms/screen_shots.asp?P=9 Internet site, accessed on Nov. 27, 2001, 1 page.
Midland Loan Services advertising tri-fold pocket folder, Overland Park, Kansas, Sep. 2002, 8 pages.
Office Action dated Oct. 14, 2009 in U.S. Appl. No. 10/336,501.
Notice of Allowance dated Aug. 19, 2010 for U.S. Appl. No. 10/336,501, filed Jan. 3, 2003.
U.S. Appl. No. 10/351,958, filed Jan. 27, 2003.
Legacy Family Tree Genealogy Software: Features, Legacy 4.0 Family Tree, 9 pages, available at www.legacyfamilytree.com/Features.asp (accessed Aug. 2002).
Legacy Family Tree Genealogy Software: Legacy Guided Tour, 4 pages, available at www.legacyfamilytree.com/Tour.asp (accessed Aug. 2002).
Legacy Family Tree Genealogy Software: Tour Information Window, 5 pages, available at www.legacyfamilytree.com/TourInformation.asp (accessed Aug. 2002).
Legacy Family Tree Genealogy Software: Tour GEDCOM Import, 3 pages, available at www.legacyfamilytree.com/TourImport.asp (accessed Aug. 2002).
Reditus: Options Design & Pricing Platform, 4 pages, available at www.cmis.csiro.au/reditus/ (accessed Aug. 2002).
Reditus: An Innovative Tool for Developing/Researching New Products, 1 page, available at www.cmis.csiro.au/reditus/Presentation/Reditus_General.doc (accessed Aug. 2000).
Reditus: A Manufacture & Trade Tool for New Financial Instruments, 15 pages, available at www.cmis.csiro.au/reditus/Presentation/ReditusGeneral.ppt (Accessed Aug. 2002).
Reditus: Monte-Carlo Engine, 2 pages, available at www.cmis.csiro.au/reditus/ModelDocuments/Reditus_brochure3.doc (accessed Aug. 2002).
How to Set up a Simple Model From Scratch in *Reditus* (May 2001), 12 pages, available at www.cmis.csiro.au/reditus/ModelDocuments/StepByStepExample.doc (accessed Aug. 2002).
Business Valuation and Deal Structure Software, Business ValueXpress, 1 page, available at www.businessvaluexpress.com/seamless.asp (accessed Aug. 2002).
Humanconcepts, LLC, The Industry Standard in Organization Charting, 2 pages, available at http://www.orgplus.com/ (accessed Aug. 2002).
OrgPlus 4.0 Professional QuickStart Guide 2002, 16 pages, available at www.humanconcepts.com (accessed Aug. 2002).
OrgPlus Quicktour, 10 pages, available at www.humanconcepts.com (accessed Aug. 2002).
Office Action dated Jun. 7, 2007 for U.S. Appl. No. 10/351,958, filed Jan. 27, 2003.
Office Action dated Mar. 10, 2008 for U.S. Appl. No. 10/351,958, filed Jan. 27, 2003.
Office Action dated Nov. 13, 2008 for U.S. Appl. No. 10/351,958, filed Jan. 27, 2003.
Office Action dated Aug. 17, 2009 in U.S. Appl. No. 10/351,958.

* cited by examiner

| ASSET_n | APPRAISAL | PROMISSORY NOTE | ESCROW AGREEMENT | RENT ROLL | OPERATING STATEMENT |
|---|---|---|---|---|---|
| | PROPERTY VALUE<br>PROPERTY ADDRESS<br>CAPITALIZATION RATE<br>DISCOUNT RATE | BORROWING ENTITY<br>NAME<br>ORIGINAL LOAN BALANCE<br>MATURITY DATE<br>INTEREST RATE | MONTHLY ESCROW PAYMENT<br>MINIMUM REQUIRED BALANCE<br>ESCROW BALANCE CAP | TENANT NAME<br>SUITE NUMBER<br>RENTAL RATE<br>LEASE EXPIRATION DATE | RENTAL REVENUE<br>PROPERTY MANAGEMENT FEES<br>CAPITAL EXPENDITURES |

COMMERCIAL MORTGAGE LOAN RECORD_n

FIG. 18

METHODS AND SYSTEMS FOR AUTOMATED DATA COLLECTION AND ANALYSIS

CROSS-REFERENCE TO RELATED APPLICATION

This application is a divisional application of prior application Ser. No. 09/998,152, filed Nov. 30, 2001 now U.S. Pat. No. 7,415,471.

FIELD OF THE INVENTION

The present invention relates generally to automated data collection and analysis and, more particularly, to a system and method for managing documentation for commercial transactions.

DESCRIPTION OF THE INVENTION BACKGROUND

Commercial mortgage loan servicing is a document-intensive business. A single loan file may contain many different documents related to the terms of a loan, including, for example, security instruments, memoranda, appraisals and the like. Loan officers, underwriters, asset managers or other personnel on the lender's staff frequently receive and capture data from these documents and report this data for a wide variety of uses in the course of originating, servicing, and/or selling commercial mortgage loans and assets.

In the course of a securitization, the lender or originator typically transfers the loan into a legal entity known as a Special Purpose Vehicle (SPV) or a trust. The SPV structure provides the investor with protection if the originator becomes bankrupt and makes it easier for the originator to classify the transfer of loans or assets as a sale. The SPV issues securities whose principal and interest are paid by cash flows generated by the loans. The SPV passes the consideration paid by the investors to the originator. The securities issued by the SPV are subject to securities laws and regulatory authorities such as the Securities and Exchange Commission. As such, it is necessary for the lender who originates the loans to abide by laws, regulations and customs regarding full disclosure of information for use by purchasers of the securities.

At the time of the sale of the assets to the trust or SPV, the lender must make representations and warranties that usually include a statement to the effect that there are no material errors in the data and/or documents provided by the lender to purchasers for the purpose of evaluating assets. If a material error is found in the data, the lender may need to repurchase the loan from the trust. This could potentially cause significant losses to the lender and potentially damage the lender's reputation for reliability in the securities markets. Furthermore, these representations and warranties may cover significant characteristics of the portfolio of loans and exceptions to underwriting policies. The support for making many representation and warranty statements lies originally in the loan documents and is aggregated in data files by the lender and then delivered to investors for use in portfolio analysis. A lender who is unable or unwilling to aggregate the data contained in the documents can cause an investor to perform labor intensive due diligence on every asset in the portfolio. Such investor due diligence requirements may cause the potential investor to discount assets. Other complications can include assets that are unprofitable for the lender to sell or which simply cannot be sold due to unknown risks.

Due to the emphasis on the accuracy and delivery of data and documents, it is customary for a lender to hire an accounting firm to audit data files relative to source documents contained in the loan file to ensure consistency between source documents and all data provided to outside parties via a prospectus, for example. The accounting firm then typically issues a "comfort letter" that notes any discrepancies or abnormalities in the data.

In one example, a securitization may contain as many as several hundred loans, each with several hundred documents. A data file is provided to all prospective investors and contains many individual data points that must be tied to a specific document in the loan file. Prospectus material, loan sale agreements, and economic valuation models are based on this data. Because loans are usually made over a long period of time and may come from a number of lenders, a great challenge is presented by collecting, validating, standardizing, and distributing data to meet the standards required by the securities market.

In the typical industry process, documents are accumulated over time and then "scrubbed" all at once immediately prior to securitization. In a conventional process, it is typical for the lender to accumulate loans through origination and acquisition over a period of a year or more. At the point of securitization, the lender reviews all files in the portfolio and performs substantial due diligence at great expense to aggregate the data into a format suitable to investors. Because documents are presented in a wide variety of formats and are handled by many different parties throughout the process, there is ample opportunity to misplace or misinterpret documentation.

Therefore, there is a need for systems and methods that improve the efficiency of the document collection and storage process, ensure accurate transfer of data from loan documents into servicing databases for analytical and servicing processes, and facilitate the distribution of data and documents to any appropriate user.

SUMMARY OF THE INVENTION

The present methods and systems include, in one embodiment, a computer-assisted method for processing asset-related documents in a database having at least one record therein. The method includes reviewing asset-related data contained on at least one asset document, receiving the asset document into the database on a flow basis, analyzing the contents of the asset document to ensure compliance with at least one standard, and providing output data from the record in the database. System and computer readable medium embodiments of the methods are also provided.

In another embodiment, the present methods and systems include a computer readable medium having computer executable instructions for performing a method for automated aggregation and authentication of asset documents into a database. The method includes associating an asset with a record in a database, inventorying an asset document into the record in the database on a flow basis, and analyzing the contents of the asset document to ensure compliance with a standard. The method further includes providing specific information contained in the asset document to a user and generating common information from the database.

In another embodiment, the present methods and systems include a computer system for automated aggregation and authentication of asset documents. The system includes a data input device for receiving first information from an asset document associated with an asset from an input source where a plurality of the asset documents associated with the asset comprise a record. The system further includes a storage device for storing the record, a processor for retrieving comparison data where the comparison data comprises compared common data fields of the stored first information from a plurality of the asset documents within the record and for providing the comparison data to a user. The processor is used further for: retrieving second information, where the second information comprises the asset documents common data fields within the record and providing the second information to a user; retrieving third information, where the third information comprises data from fields common to the multiple records and providing the third information to a user; identifying missing data for the asset; and providing a missing data output to notify a user. The system further includes a data output device for generating first output information from the processor.

In another embodiment, a system is provided that includes a computer system for managing, servicing and aggregating commercial mortgage loans. The system includes a means for inputting information regarding a plurality of commercial mortgage loans, a means for storing the information regarding the commercial mortgage loans, and a first query means for collecting information from at least one commercial mortgage loan. The system further includes a first query result presentation means for presenting the collected information, a second query means for determining if any data is missing from the commercial mortgage loan, and a second query result presentation means for presenting a missing data notification. The system further includes a means for aggregating the information of the commercial mortgage loans wherein the aggregating means has an asset analysis means for determining if the commercial mortgage loan is prepared for securitization, a means for displaying aggregated information, a means for alerting a user if any aggregated information necessary for securitization is missing, and a means for extracting information.

In another embodiment, a computer-assisted method for automated aggregation and authentication of asset documents is provided. The method includes associating an asset with a record in a database, inventorying an asset document into the associated record in the database in near real time as the asset document becomes available to the loan originator, and analyzing contents of the asset document to ensure compliance with banking standards for loan securitization. The system further includes providing specific information contained in the asset document to a user and generating common information from a plurality of the records where the common information is generated for the purpose of securitizing the asset into a trust and providing common information to potential investors in the trust.

In another embodiment, a computer readable medium is provided having computer executable instructions for performing a method for processing asset-related documents in a database having at least one record therein. The method includes reviewing asset-related data contained on at least one asset document, receiving the asset document into the database on a flow basis, analyzing contents of the asset document to ensure compliance with at least one standard, and providing output data from the record in the database.

BRIEF DESCRIPTION OF THE DRAWINGS

FIG. 6 is a record view showing, by way of example, the fields comprising the record shown in FIG. 1;

FIGS. 12A and 12B are examples of graphical user interfaces of one embodiment of the system shown in FIG. 1;

FIG. 18 is an example of a graphical user interface for selecting a loan portfolio or set of loans to produce a report or datafile;

DETAILED DESCRIPTION OF EMBODIMENTS OF THE INVENTION

Figure 1:
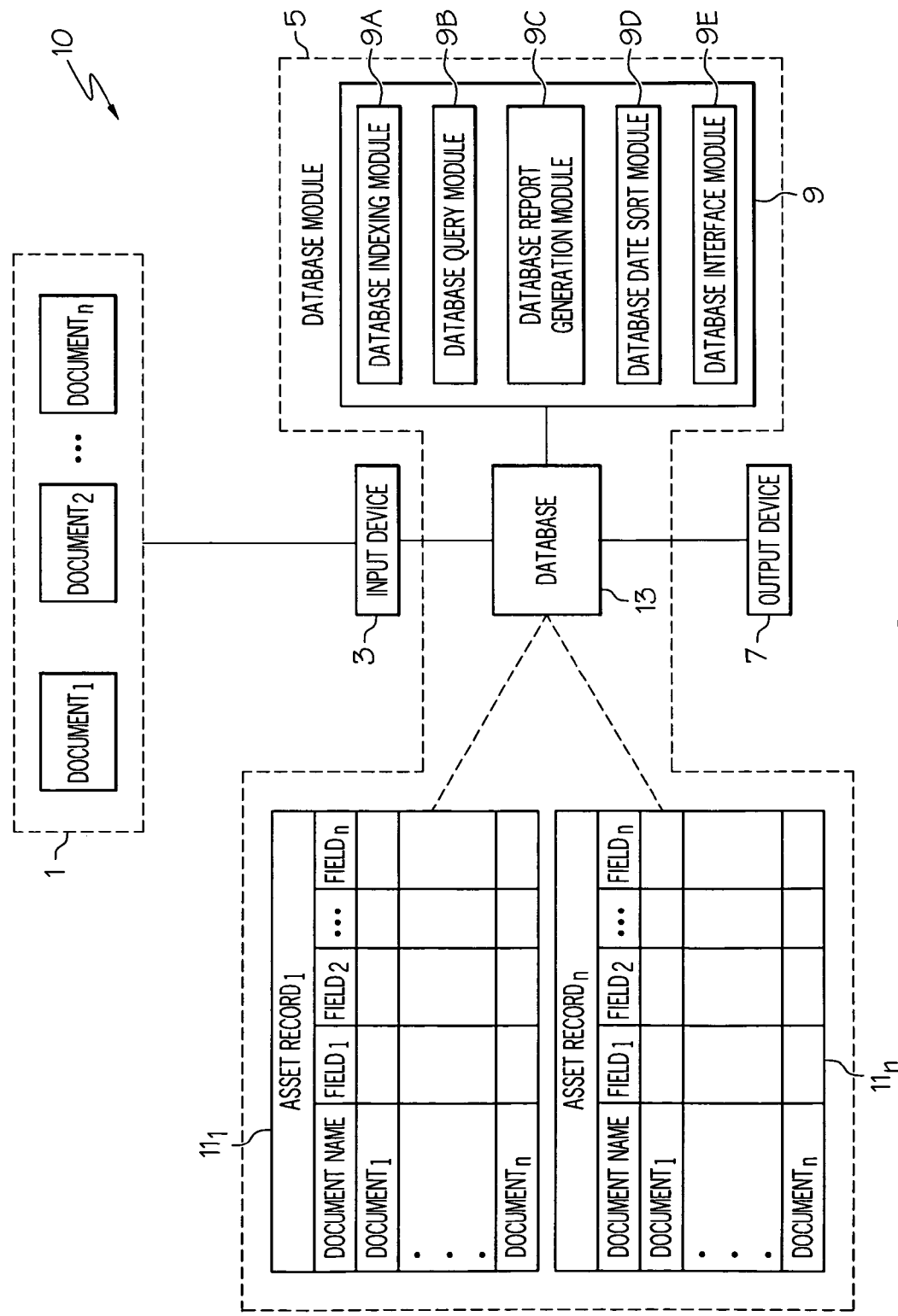
FIG. 1 is a block diagram showing one embodiment of a system for automated collection of document information.

The present inventor concluded that what are needed are methods and systems that allow the lender to efficiently accumulate data efficiently on a flow basis—near real time as the asset documents become available to the loan originator or another party concerned with loan maintenance—over the course of time so that the data is readily available and substantially reliable at the time of securitization. The inventor determined that improved methods and systems are needed so that when the loan is originated, substantially all available documents are entered into the system, and the system, in turn, can determine if the data meets applicable standards for securitization. As further documents pertaining to the loan become available, the documents can also be entered into the system on a flow basis. Methods and systems are needed that flow information into the database in near real time and provide a method to ensure data integrity. Such methods and systems would reduce due diligence on the lender's behalf in comparison to industry averages, and would improve the integrity of the collected data. Such methods and systems would also allow the lender to concentrate efforts on effecting the transaction and attend to investor needs, rather than expending costly resources on simply attempting to collect, organize and process data.

Thus, there is a need for systems and methods for providing rigorous collection of loan documentation before a loan is sold into a trust or SPV for securitization. This rigorous collection can occur on a flow basis—in near real time—as the documents pertaining to the loan become available to those concerned with loan origination and maintenance.

There is a further need for systems and methods by which the information gleaned from the loan documents can be validated against applicable standards in near real time as the loan documents become available to those concerned with loan origination, maintenance and securitization, thereby reducing or eliminating costly due diligence prior to securitization.

There is a further need for systems and methods by which data points are aggregated across several loans into a single datafile, where the datapoints comprise information taken from a plurality of loans that are to be securitized and the datafile is compiled for the purpose of corroborating the representations and warranties that are to be made by the originator. The aggregated data provides information necessary to satisfy regulations pertaining to full disclosure of material information in loan securitizations and relevant information that potential investors may require.

There is a further need for systems and methods that eliminate the need to manually aggregate data pertaining to individual loans or a plurality of loans. Once all of the information is collected and validated there should be little or no further need for costly manual substantiation of any data point contained in the database or any representation or warranty made regarding the loans.

There is a further need for systems and methods to provide a single source of information regarding loan portfolios where the systems and methods capture, validate, and distribute reliable data to investors, attorneys, investment bankers, and many other participants involved in the securitization process.

For the foregoing reasons, there is a need for methods and systems that can reduce the amount of due diligence required for loan securitization, improve the reliability of asset information provided to potential investors and provide a clearinghouse system for asset document information.

As used herein, "asset" includes an item of value, for example a debt secured by real or personal property.

"Flow basis" indicates that information is analyzed and entered into a database as the information becomes available to a loan originator or someone responsible for loan maintenance or any other user of the system and method described herein. With respect to flow basis, information can be collected and validated based on securitization standards. It can be appreciated that the data can be collected independent of its end use.

The term "standard" used herein comprises, for example, applicable banking, legal, customary and trade standards for asset securitization and securities issuance, or the uniformity of preexisting data.

FIG. 1 is a block diagram showing one embodiment of a system 10 for automated collection of document information which can be, for example, commercial mortgage loan information. A plurality of documents 1 are entered into a database 13 through an input device 3 such as, for example, an optical scanner or a graphical user interface residing on a PC. However, any form of data entry device capable of communicating with a server 5 can be used, as is known in the art. The database 13 resides on the server 5, where the database contains records $11_1$-$11_n$ that store the plurality of documents 1. Each of the individual records $11_1$-$11_n$ are associated with individual assets. The database 13 may be a commercial relational database such as Microsoft® Access and can contain preprogrammed modules 9. The database 13 is capable of sorting, indexing and generating reports through output device 7 which may be, for example, a CD writer, a printer, a display on a PC, and the like. The database 13 includes a high-capacity storage medium configured to store individual asset records and related loan information. In one aspect, the database 13 is configured as a set of high speed, high-capacity hard drives, such as organized into a Redundant Array of Inexpensive Disks (RAID) volume, for example. However, any form of volatile storage, non-volatile storage, removable storage, fixed storage, random access storage, sequential access storage, permanent storage, erasable storage, and the like would be equally suitable.

In one embodiment, the documents 1 include commercial mortgage loan documents. However, the system 10 can accommodate a wide range of document types used in other areas of asset securitization or in the banking system as well as other document management applications. One skilled in the art can recognize the applicability of the present methods and systems to these related document types.

As the documents 1 become available they are entered into the database 13 on a flow basis. This is preferably to be done within five days of receipt of the document by the loan originator or another party concerned with loan maintenance, more preferably to be done within 1 day of receipt of the document by the loan originator or another party concerned with loan maintenance, most preferably to be done upon receipt of the document by the loan originator or another party concerned with loan maintenance, thereby allowing a user to enter the documents on a flow basis over time. Flow basis is in contrast to accumulating all of the documents over a period, typically extending six months to a year, and then entering them all at once.

In one aspect, the server 5 can be a general purpose, programmed digital computing device consisting of a central processing unit (CPU), random access memory (RAM), non-volatile secondary storage, such as a hard drive or CD-ROM drive, network interfaces, and peripheral devices, including user interface means, such as keyboard and display. Program code, including software programs and data are loaded into the RAM for execution and processing by the CPU and results are generated for display, output, transmittal, or storage. In the described embodiment, the individual server can be an Intel-Pentium® based server system such as is available, for example, from Dell Computers, Austin, Tex., or Compaq Computers, Houston, Tex. The system is preferably equipped with at least 128 MB RAM, at least 100 GB hard drive capacity, data backup facilities, and related hardware for interconnection to an intranet and the Internet.

Figure 2:
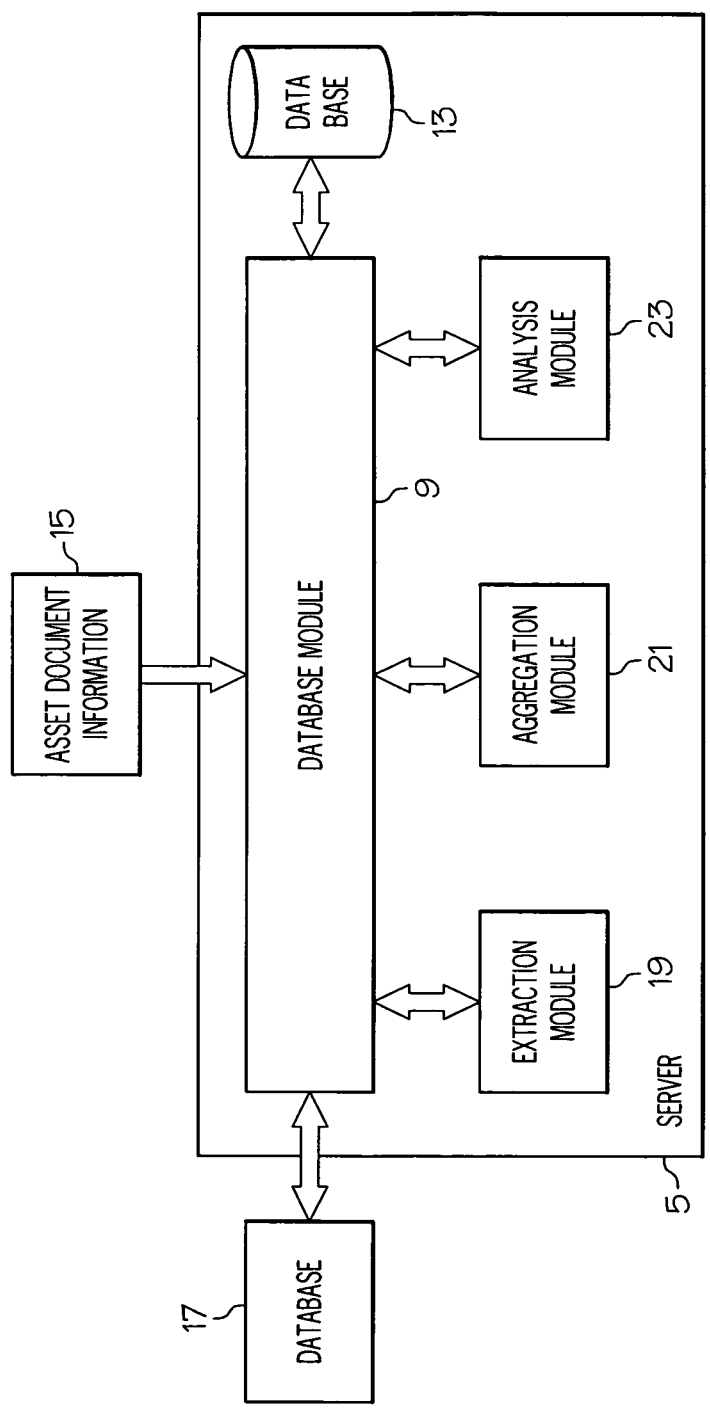
FIG. 2 is a block diagram showing the software modules of the system shown in FIG. 1.

FIG. 2 is a block diagram showing the software modules 9, 19, 21, 23 of the system shown in FIG. 1. Each module is a computer program written as source code in a conventional programming language, such as Visual Basic or C++, for example, and is executed by the CPU in object or byte code as is known in the art. The individual modules 9, 9A, 9B, 9C, 9D, 9E, 19, 21, 23 may also be written in a programming language provided with a commercial database program such as Microsoft® Access. The various implementations of the source code and object code can be held on a computer readable medium, including, for example, a transmission medium in a carrier wave. There are four basic software modules which functionally define, for convenience of disclosure, the operations performed by the server system 5: a database module 9, an extraction module 19, an aggregation module 21, and an analysis module 23. In one embodiment, these modules 9, 19, 21, 23 are executed on a single server although a single or multiple component server could also perform this functionality. The individual module functions are described in more detail in FIGS. 3, 4, 5.

For each asset, the database 13 receives asset document information 15 pertaining to that asset, and the database module 9 stores the information 15 in record form in the database 13. The database module 9 organizes the asset document information 15 in the database 13. The database module 9 further provides the facilities for efficiently storing and accessing the asset information 15 that is collected on a flow basis. The asset document information is stored in a record $11_1$-$11_n$ (as shown in FIG. 1) and organized into fields (an example of which is shown in FIG. 6). The database server 5 performs the functionality of the database module 9. Any type of database organization can be utilized, for example, a flat file system, hierarchical database, a relational database, or distributed database, such as provided by database vendors Microsoft® or Oracle®. In alternative embodiments of the present methods and systems, conventional spreadsheet software and Lotus Notes® applications can be employed.

The analysis module 23 analyzes the asset document information 15 that is entered into the database 13. The analysis module 23 compares the asset document information 15 to a preprogrammed standard to ensure compliance. The preprogrammed standard may be, for example, an applicable banking industry standard for commercial mortgage loan information, a legal standard for mortgage documents, an applicable banking standard for securitization of commercial mortgage loans, and the like. The asset document information 15 is further compared to information stored in the database 13 to determine a data mismatch. Through the use of the asset document information 15 entered on a flow basis, the analysis module 23 ensures that asset document information 15 entered into the database 13 meets applicable standards for asset securitization as the asset data is accumulated, reducing the need for manual analysis of the asset information when the asset is securitized into a trust or SPV. The analytic operations of the analysis module 23 are further described below with reference to FIG. 3. The server 5 performs the functionality of the analysis module 23.

The aggregation module 21 collects data contained in a plurality of database records $11_1$-$11_n$. A user of the system, for example, may desire information contained in one field of multiple database records. The aggregation module 21, working in conjunction with the database module 9, compiles the information contained in the various records into one datafile. The functionality of the aggregation module 21 is performed by the server 5.

The extraction module 19 provides automated information output upon request of a system user. The output could be, for example, electronic mail, a printed report, information that is written to a CD or information that is published on a website or any other means known to those skilled in the art. In the described embodiment, the output is presented in a tiered manner. The user requested information 17 can, for example, be displayed on a PC monitor. The information 17 could further be sent via electronic mail upon user request after display on a monitor. The information 17 could further be written to a CD where the size of the information 17 is too large for transmission through standard electronic mail systems. Finally, the information 17 could be made available to another server for display on a website that provides multiple users access to the information 17. The server 5 performs the functionality of the extraction module 19.

Figure 3:
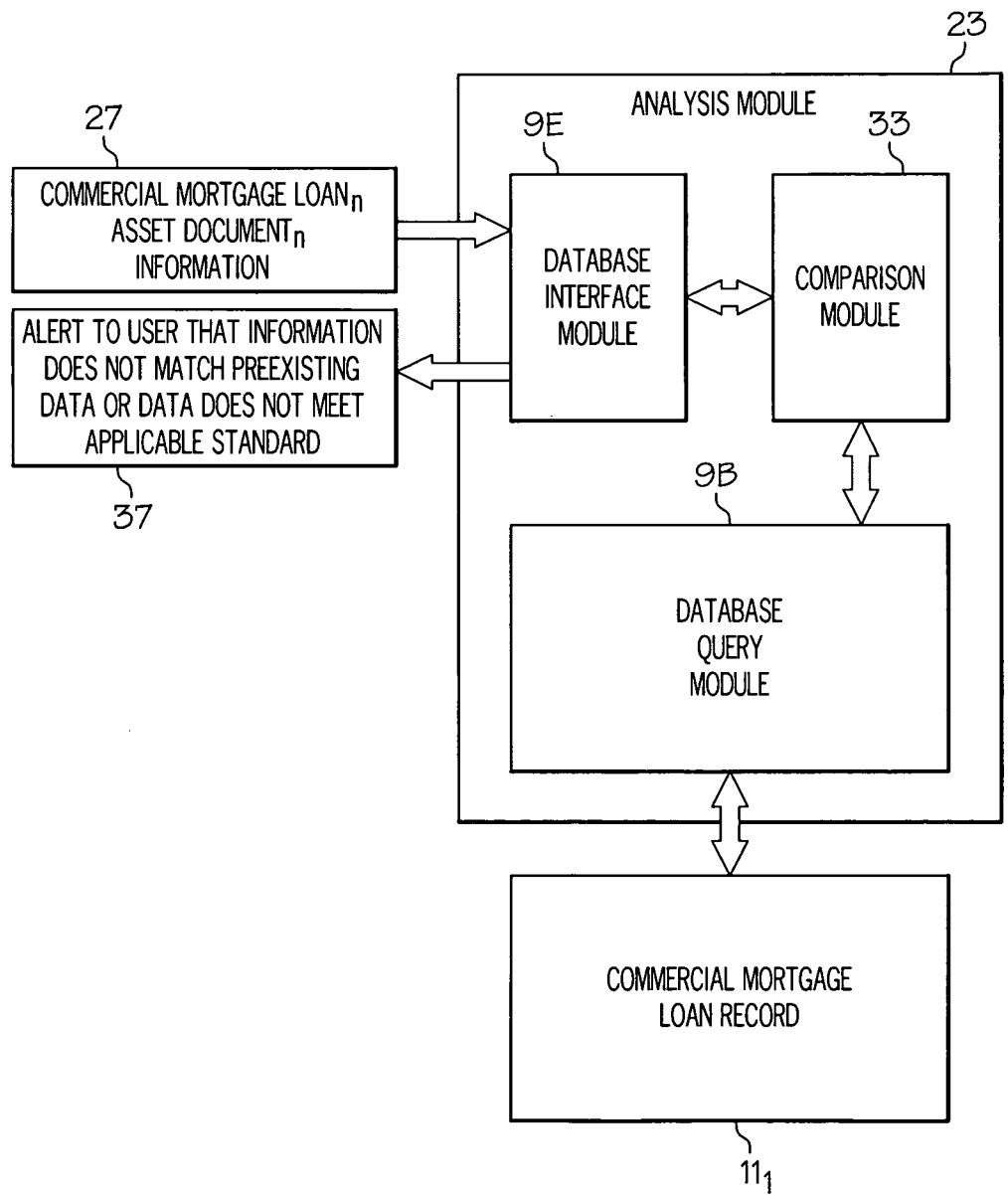
FIG. 3 is a block diagram showing the analysis module of the server system in FIG. 2.

FIG. 3 is a block diagram showing the analysis module 23 of the server 5 of FIG. 2. The analysis module 23 contains three functional submodules: the database interface module 9E and the database query module 9B, and the comparison module 33. The database interface module 9E and query module 9B may be preprogrammed in a commercial database such as Microsoft® Access where a user can tailor them to specific needs, as is known in the art. The purpose of the comparison module 33 is to compare, for example, commercial mortgage loan document information 27, as shown, to a standard preprogrammed into the comparison module 33. This standard, as explained above, may be a banking industry standard or a legal standard. The comparison module 33 further compares the information 27 to information contained in the record $11_1$-$11_n$ corresponding to that particular asset. The analysis module 23 can operate either in batch mode wherein an alert 37 is generated for information 27 from a group of asset documents or in a dynamic mode wherein the alert 37 is generated in real time as the information 27 is entered into the database 13.

The analysis module 23 receives information 27 from, for example, commercial mortgage loan asset documents. This information is entered into the database 13 via a database interface module 9E. The interface module 9E calls the comparison module 33 based on a user selection of a particular asset. The comparison module 33, in turn, calls a database query via the database query module 9B that locates the appropriate record $11_1$ associated with the asset. The comparison module 33 compares the information 27 to a preprogrammed standard, a banking standard or legal standard, for example. If the information 27 does not meet that standard, the alert 37 is generated that is presented to a user via the interface module 9E. The standard may be programmed in the form of a user-selected template for data entry into a particular asset record, or a software object called by the comparison module 33 with preprogrammed logic reflecting the appropriate standard. If the information 27 is already contained in the database in another field of the record $11_1$, the comparison module 33 pulls this preexisting information via the query module 9B and compares it to information 27. For example, with regard to commercial mortgage loans, building square footage contained in the mortgage document can be compared against the square footage in the building inspection. The comparison module compares the square footage information contained in the record $11_1$ and, in the event of a mismatch, an alert 37 can be generated and displayed to the user.

Figure 4:
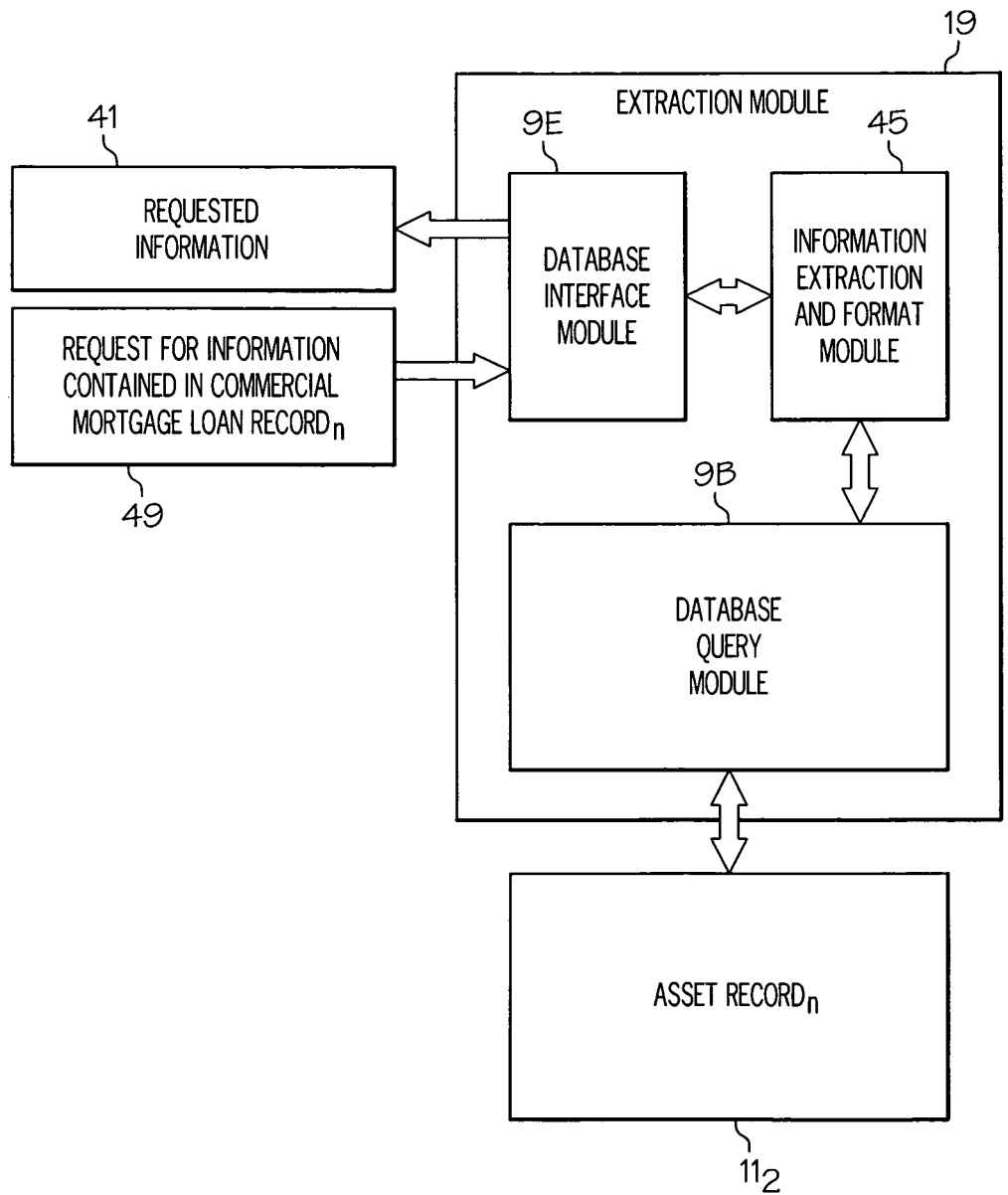
FIG. 4 is a block diagram showing the extraction module of the server system in FIG. 2.

FIG. 4 is a block diagram showing the extraction module 19 of the server system in FIG. 2. The extraction module 19 contains three submodules: the database interface module 9E, the information extraction and format module 45 and the database query module 9B. The database interface module 9E and query module 9B function in the manner stated above with respect to the analysis module 23. An information request 49 is sent to the extraction and format module 45 via the interface module 9E. The extraction and format module 45 calls the database query module 9B to find the appropriate record $11_2$ in the database (not shown). The extraction and format module 45 extracts the requested information 49 from the record into a temporary datafile and then formats the extracted data in a manner requested by the user. The interface module 9E may contain preprogrammed graphical user interface screens programmed to display the extracted and formatted information. The interface module 9E may further contain options to print the extracted information, for example, or send the information to a CD or electronic mail.

Figure 5:
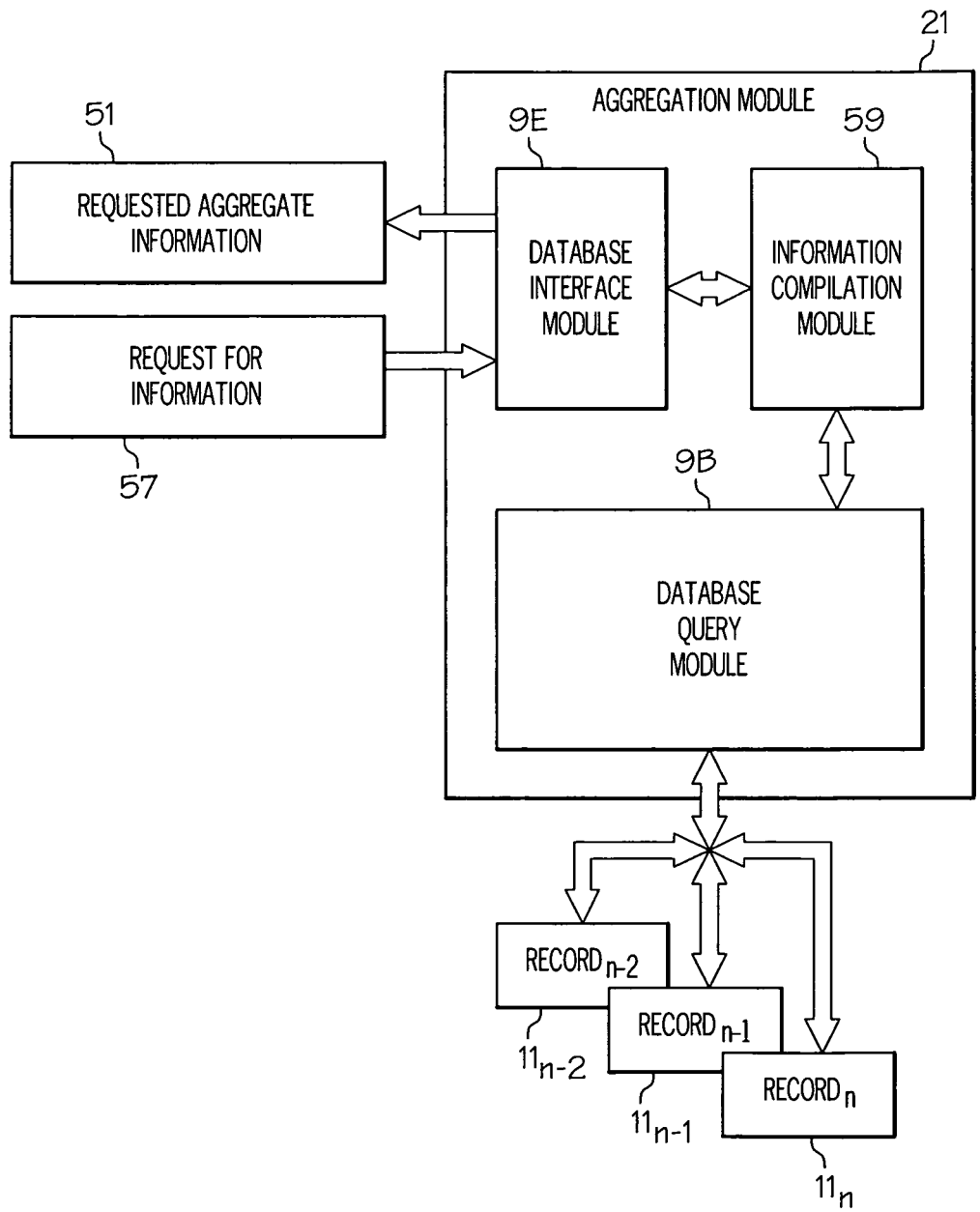
FIG. 5 is a block diagram showing the aggregation module of the server system in FIG. 2.

FIG. 5 is a block diagram showing the aggregation module 21 of the server system in FIG. 2. The aggregation module 21 collects data contained in a plurality of database records $11_1$-$11_n$. A user of the system, for example, may desire common information contained, for example, in one field of multiple database records. The user generates a request for information 57 that is sent to the information compilation module 59 via the database interface module 9E. The information compilation module 59, in turn, calls the query module 9B. The compilation module 59 and the query module 9B determine what records $11_1$-$11_n$ must be queried and collected to satisfy the request 57. The query module 9B indexes the database based upon the request 57. Upon indexing of the records containing the requested common information, the compilation module 59 extracts the data contained in the fields of the records $11_1$-$11_n$ and writes it to a temporary datafile. An example of this is a request by a user for all property balance sheets contained in a plurality of database records. The compilation module 59, in conjunction with the query module 9B, indexes the database on the field of property balance sheets. The datafile is then displayed via the interface module 9E in the form of aggregated common information 51 as requested.

FIG. 6 is a record view illustrating the fields comprising an example record $11_n$ shown in the database 13 of the system of FIG. 1. Each record $11_n$ is illustrative of some of the information typically required to securitize an asset or loan into a trust or SPV. For example, for a commercial mortgage loan, information associated with the following documents can be recorded in the database record $11_n$: the asset name 61, appraisal 63, promissory note 67, escrow agreement 71, rent roll 75, and operating statement 79. Pertinent information is taken from documents 63, 67, 71, 75, and 79 and entered into their corresponding representative data fields 65, 69, 73, 77, and 81, respectively. The list is illustrative, but not exhaustive, of the information typically required for a commercial mortgage loan and can be modified by one skilled in the art to accommodate other fields for any financial instruments suitable for securitization. From these fields, many forms of investor information can be generated as is known in the art. The fields shown in FIG. 6 can be common to two or more records contained in the database 13 and can serve as an index for the database query module 9B. The records are typically indexed based on field 61 and stored in that manner. The information compilation module 59 can pull information contained in a single field or multiple fields.

Common information can be stored in more than one field of the record $11_n$. For example, the appraisal value contained in appraisal field 63 must match the appraisal value entered as part of the promissory note information 67 entered in representative data fields 69. The comparison module 33 described above compares the information stored in these fields upon entry of data into either field and generates the alert 37 if the appraisal value does not match.

Figure 7:
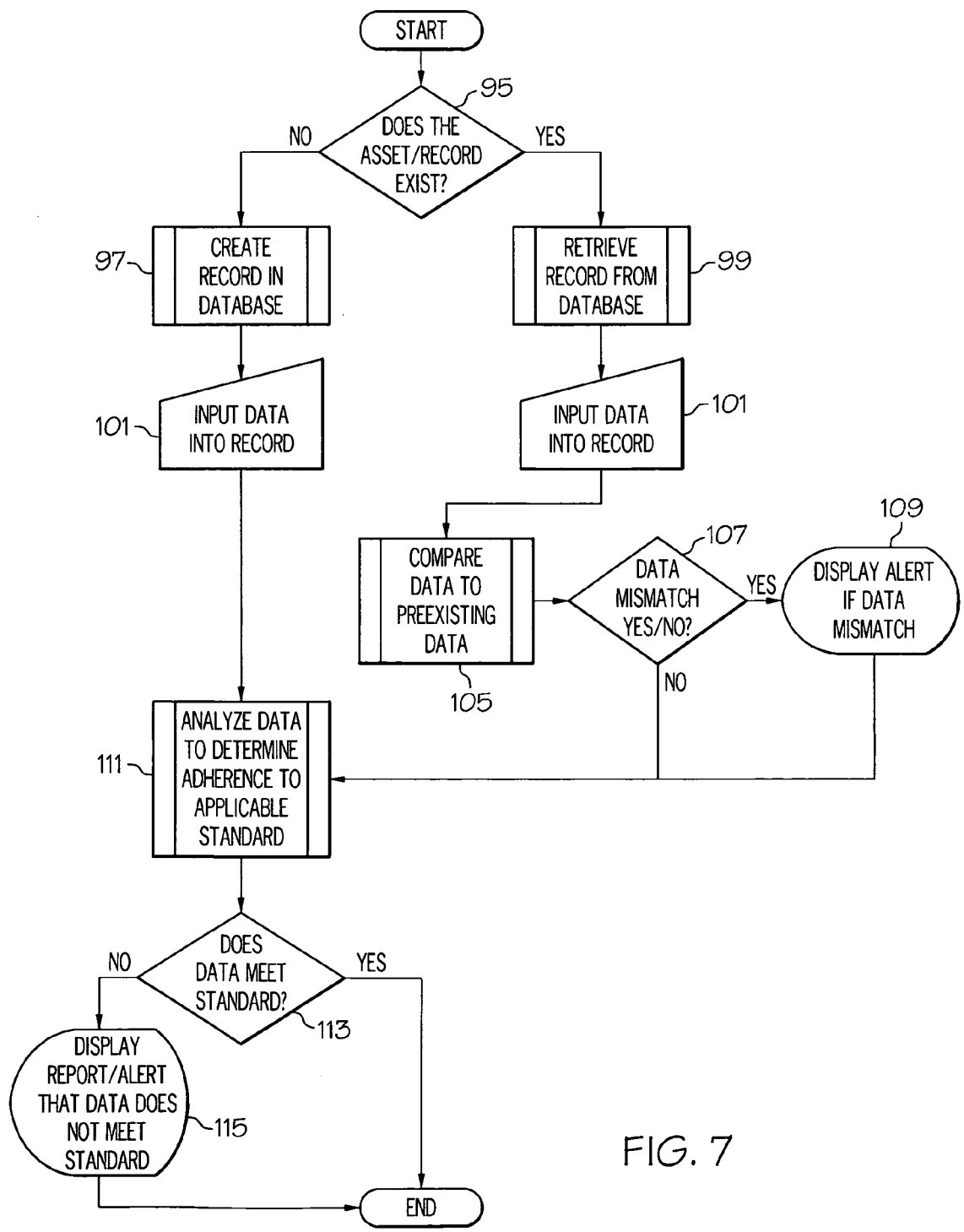
FIG. 7 is a flow diagram showing one embodiment of a routine for processing data in a method and system for collecting document information.

FIG. 7 is a flow diagram showing one embodiment of a method for inputting data into either an existing record or creating a record and then inputting data on a flow basis. The input data is compared to preexisting data and to a standard. In one aspect, the method can be implemented as a conventional computer program for execution by the server system 10 shown in FIG. 1. As a preparatory step, the user determines in step 95 if this is a preexisting asset matching a record $11_1$-$11_n$ in the database 13 (as shown in FIG. 1). If the record exists, the database executes a query and retrieves the record in step 99. The user then inputs the asset data in step 101 into the record. The entered data is then compared to preexisting data in step 105 to determine if there is a data mismatch in step 107. In the event of a mismatch, the user is alerted in step 109. If the record does not exist, the user creates the record in step 97 corresponding to the asset and then inputs the data in step 101 into the database. Upon successful data entry, the entered data is compared to a standard in step 111 to ensure compliance with the standard. Upon comparison to the standard in step 113, the program generates, for example, an alert, a report or other like notification if the data does not meet the standard in step 115. The asset documents are entered into the database as soon as they become available to a user, or in a reasonable time thereafter, and are compared to a standard and preexisting data as the asset information is entered into the database. Thus, it can be seen that the information is flowed into the database or entered on a flow basis.

Figure 8:
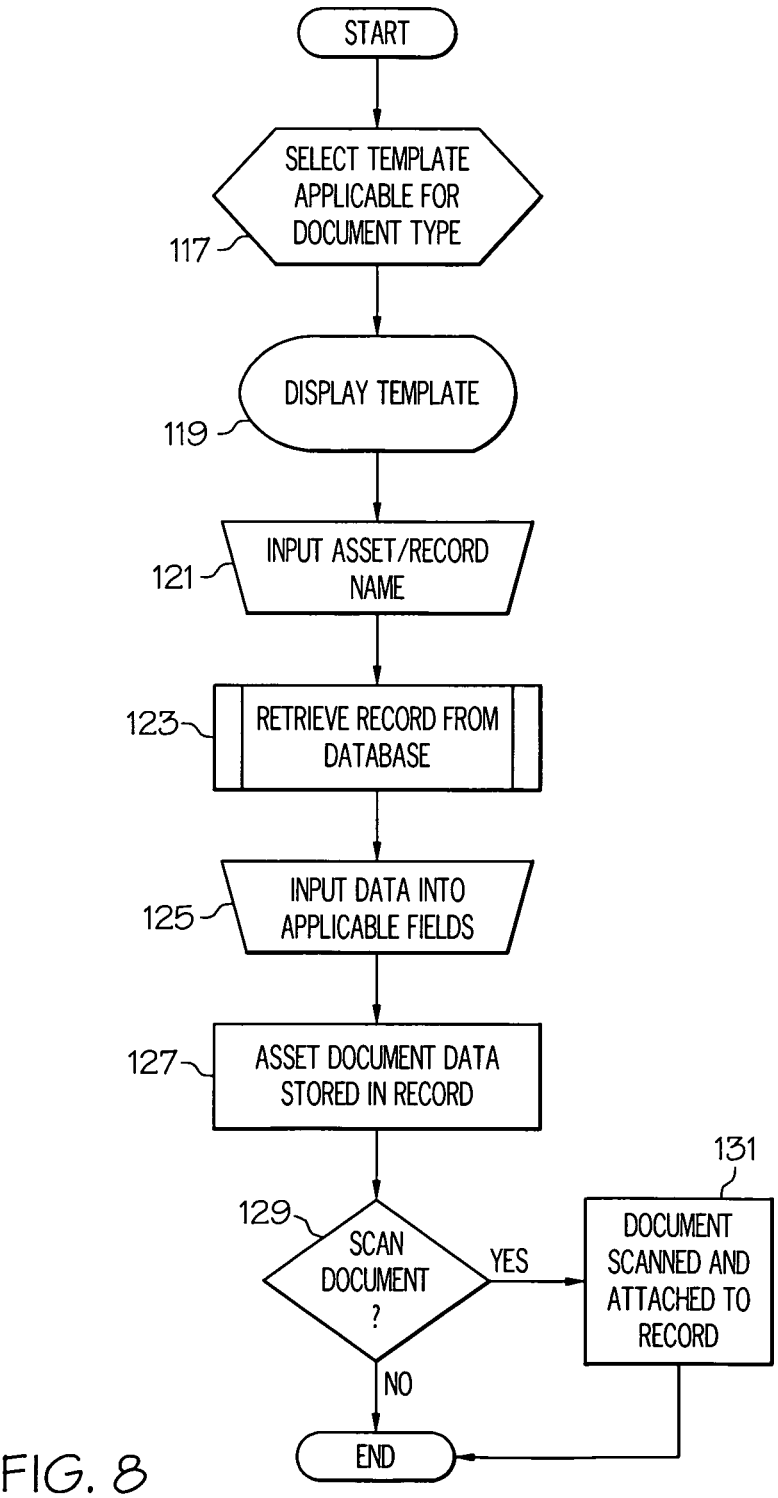
FIG. 8 is a flow diagram showing one embodiment of a routine for entering data and scanning a loan document.

FIG. 8 is a flow diagram showing one embodiment of a routine for entering data and then scanning a loan document. The purpose of this routine is to illustrate data entry into the database where the data is entered through a graphical user interface template. As a preparatory step, the user selects the applicable template for the document type in step 117. The program then displays the template to the user in step 119. The user inputs the asset or record name or, for example, selects the asset from a menu in step 121. The database then queries the record in step 123 from the database associated with the asset. The user then inputs data into the required fields in step 125 and the program, in turn, stores the input information in the record in step 127. The program then prompts the user in step 129 to scan the document. If the user opts to scan the document, an electronic facsimile of the asset document is created and associated with that field of the asset record in step 131.

Figure 9:
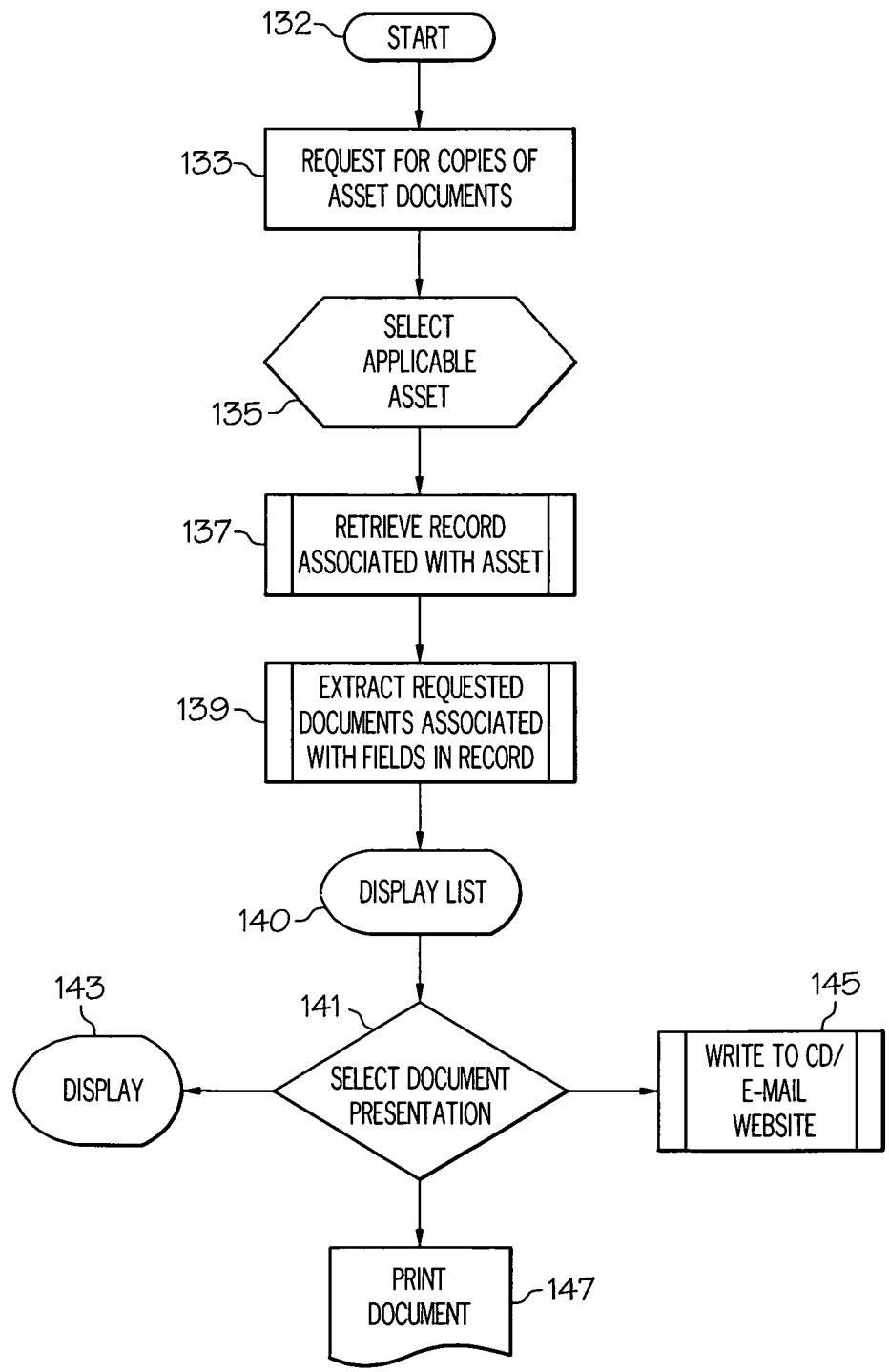
FIG. 9 is a flow diagram showing one embodiment of a routine for extracting facsimiles of asset documents stored in a record.

FIG. 9 is a flow diagram showing one embodiment of a routine for extracting electronic facsimiles of asset documents stored in a record. The purpose of this routine is to extract copies of original documents stored in a record $11_1$-$11_n$ associated with an asset in a database 13. The user, through the database interface, requests copies of original asset documents in step 133. The user selects the applicable asset in step 135. The appropriate record associated with the asset is queried and retrieved from the database in step 137. The required documents are extracted from the retrieved records in step 139 and displayed as a list to the user in step 140. The user selects the means for extracting the electronic facsimiles of the documents in step 141, where the means include, for example: displaying on a monitor in step 143, hard copy printing in step 147 or writing the information to a CD, electronic mail or website in step 145, for example.

Figure 10:
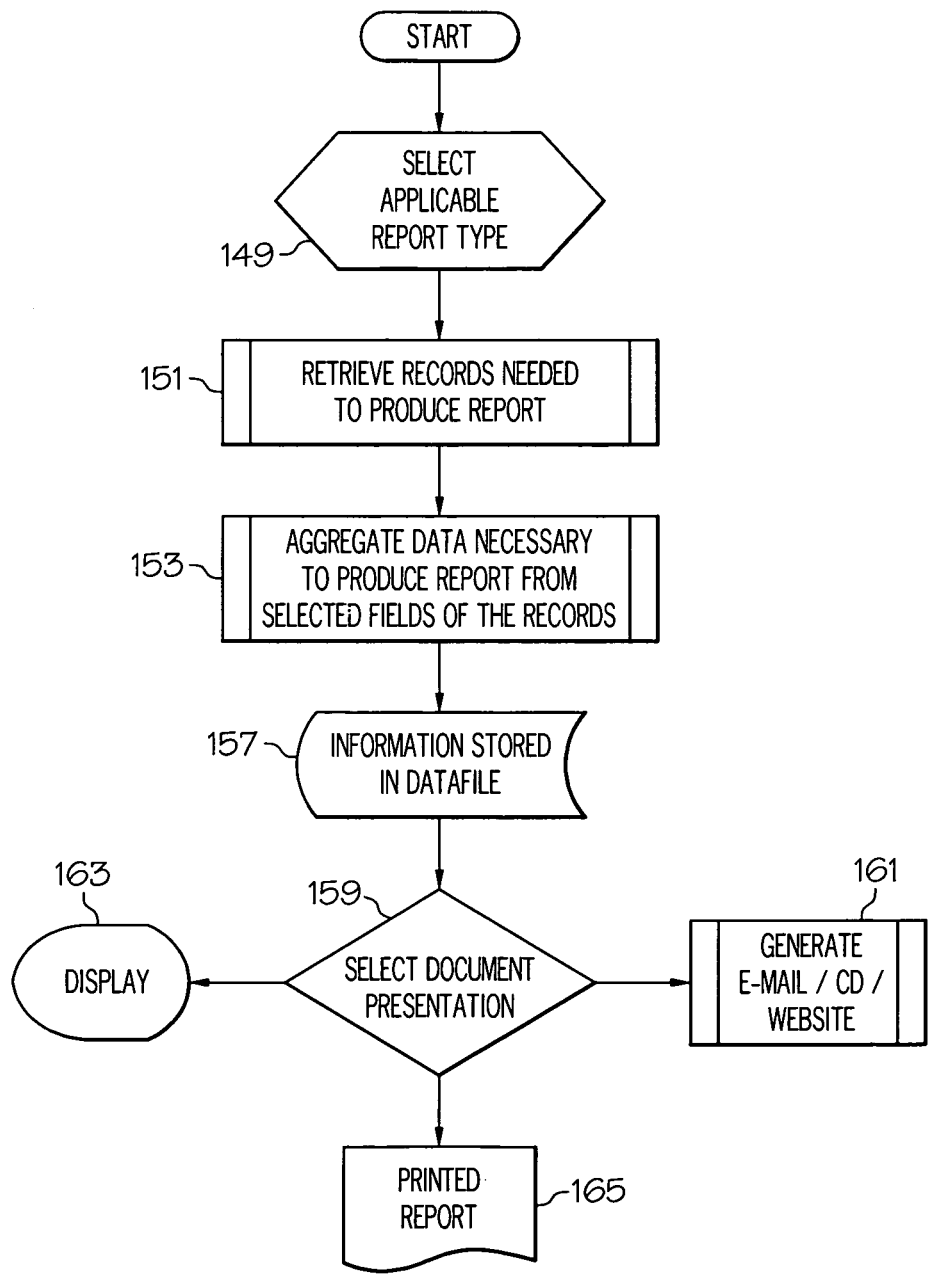
FIG. 10 is a flow diagram showing one embodiment of a routine for aggregating data from several records and allowing a user to determine the manner in which the aggregated data is presented.

FIG. 10 is a flow diagram showing one embodiment of a routine for aggregating data from several records and then allowing a user to determine the manner in which the aggregated data is presented. The purpose of this routine is to provide information regarding a portfolio of assets to potential investors where the assets form the basis of the securities issued from a trust or SPV. As a preparatory step, the user selects the report type desired in step 149. The records required to form the report are retrieved from the database in step 151. The data comprised in the records are collected from the pertinent fields of the retrieved records in step 153 and stored in a datafile in step 157. The user then determines the manner by which the data are to be presented in step 159, examples of which include: displayed as one file in step 163, generated in a report in step 165, written to a CD, sent via an electronic mail or published on a website in step 161.

Figure 11:
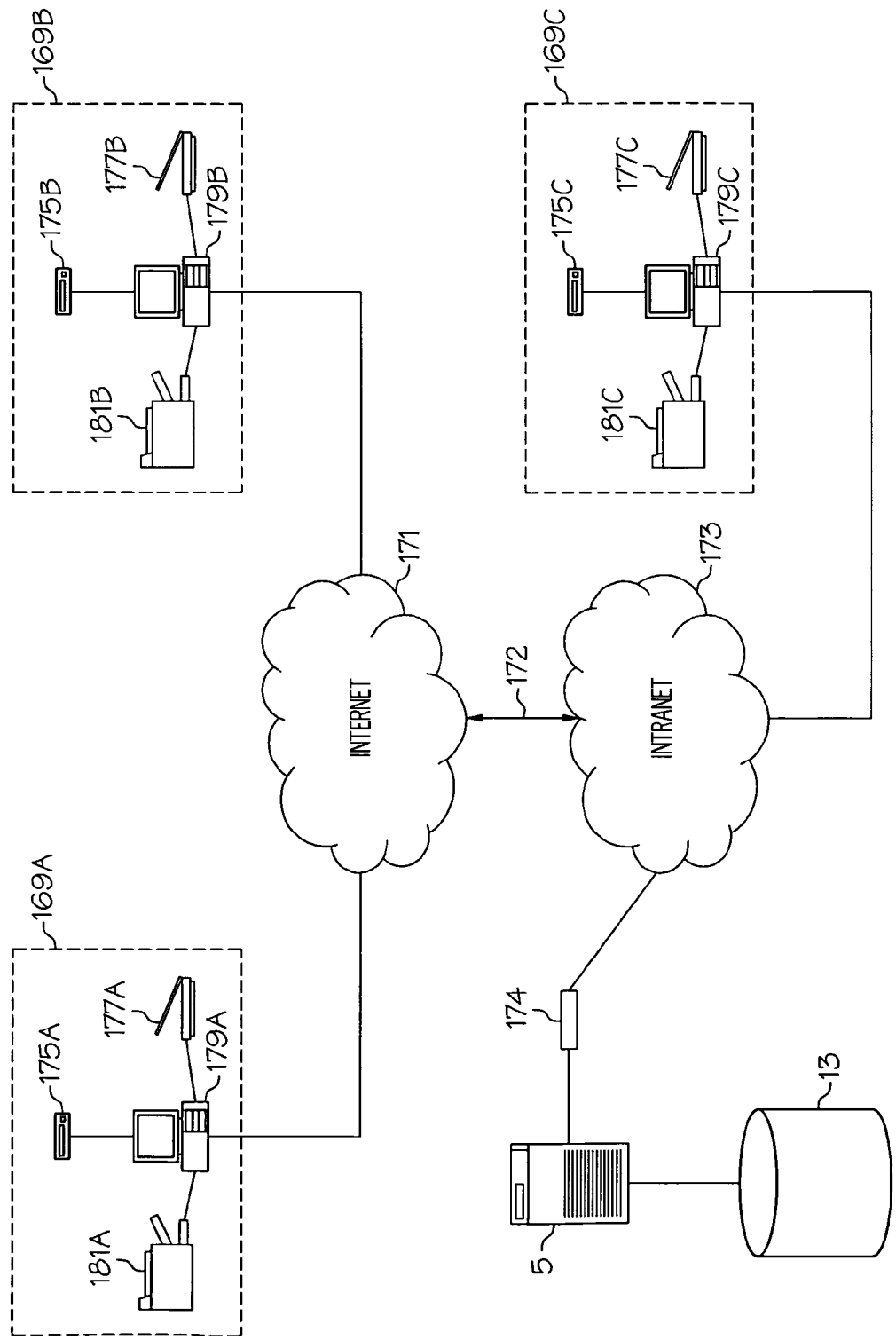
FIG. 11 is a block diagram showing the hardware components of the system shown in FIG. 1.

FIG. 11 is a block diagram showing one illustrative embodiment of the hardware components of the system shown in FIG. 1. A remote PC 179 can be equipped with a printer 181A, B, C, a scanner 177A, B, C and a CD optical drive 175A, B, C. The components comprise a workstation 169 capable of communicating with the Internet 171. Each workstation is preferably equipped with 64 MB RAM, 10 GB hard drive capacity and related equipment. In addition, the workstations 169A, B, C are also Intel Pentium®-based personal computer workstations available from, for example, Dell or Compaq. The workstations 169A, B, C each further comprise a programmed digital computing device consisting of a central processing unit (CPU), random access memory (RAM), non-volatile secondary storage, such as a hard drive or CD-ROM drive, network interfaces, and peripheral devices, including user interface means, such as keyboard and display. Program code, including software programs and data are loaded into the RAM for execution and processing by the CPU and results are generated for display, output, transmittal, or storage. The server 5 is a general purpose, programmed digital computing device consisting of a central processing unit (CPU), random access memory (RAM), non-volatile secondary storage, such as a hard drive or CD-ROM drive, network interface, and peripheral devices, including user interface means, such as keyboard and display. Program code, including software programs and data are loaded into the RAM for execution and processing by the CPU and results are generated for display, output, transmittal, or storage. In the described embodiment, the individual server is an Intel-Pentium® based server system such as is available from Dell or Compaq. The system is preferably equipped with at least 128 MB RAM, and at least 100 GB hard drive capacity, data backup facilities, and related hardware for interconnection to an intranet and the Internet. Other types of server and workstation systems including minicomputers, mainframe computers, supercomputers, parallel computers, digital data processors and the like are equally suitable, as is known in the art.

Asset data are communicated from the workstations 169 and 167 via the Internet 171 or the intranet 173 to the router 174 and ultimately to the server 5 where the database 13 resides. However, any type of communications link could be used including a serial link, data telephone link, satellite link, radio-frequency link, infrared link, fiber optic link, coaxial cable link, television link, and the like, as is known in the art. Also, the intranet 173 is comprised of a server or plurality of servers that are typically minicomputers or Intel Pentium® based PCs and preferably equipped with at least 128 MB RAM, and at least 100 GB hard drive capacity, data backup facilities, and related hardware for interconnection to the Internet 171. The connection 172 is typically a T-1 network router such as manufactured by Cisco Systems or Marconi, for example. However, any type of interfacing device suitable for interconnecting a server to a network could be used including a data modem, cable modem, network interface, serial connection, data port, hub, frame relay, digital PBX, CITRIX Winframe®, and the like, as is known in the art.

In the present embodiment, asset data is input via workstations 169 and transmitted via the Internet 170 through the connection 172 and to the intranet server 173. Information is also input through workstations 169C connected directly to the intranet server 173. The information can be routed 174 to the database server 5 for storage in the database 13. To ensure reliable data exchange, the intranet server can implement a TCP/IP protocol stack, although other forms of network protocol stacks, such as HTTP, are suitable.

Figure 12A:
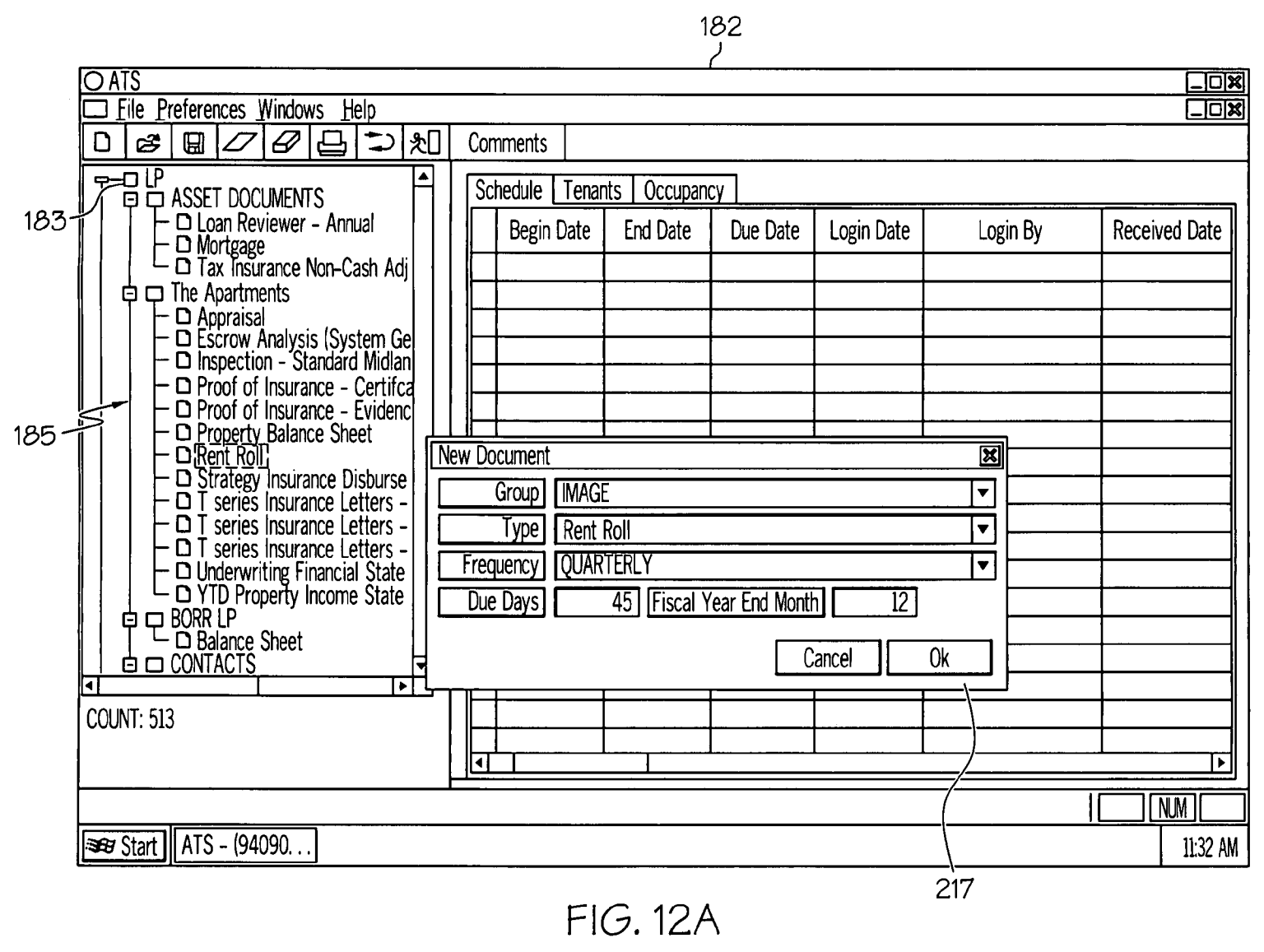
Figure 12B:
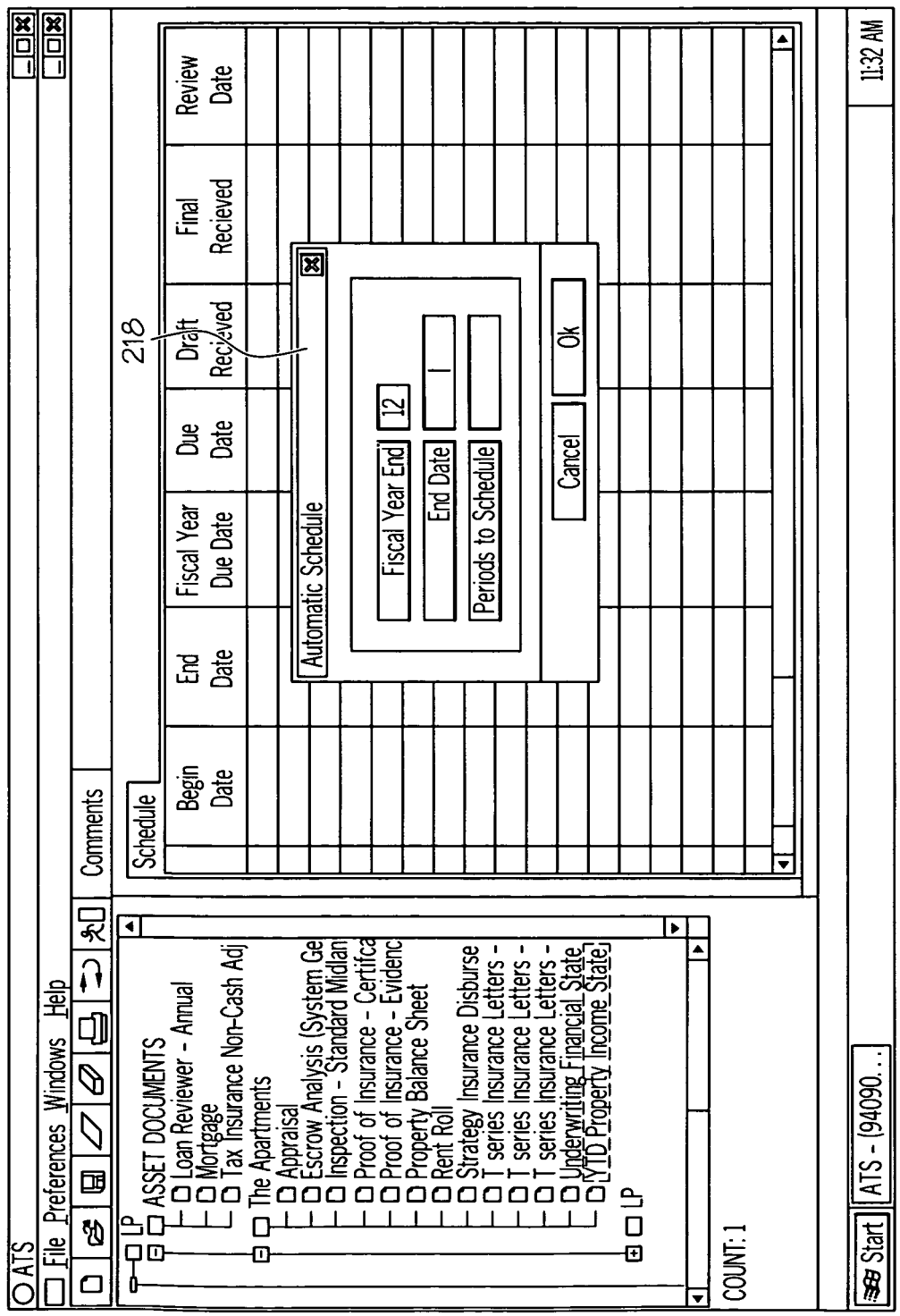

Referring now to FIGS. 12A and 12B, FIG. 12A is an example of a graphical user interface of one embodiment of the system shown in FIG. 1. As shown, the screen 182 contains a directory tree 185 that corresponds, in part, to the fields of the database record $11_n$ (as shown in FIG. 6) and is an example of one embodiment of the database interface module 9E shown in FIGS. 3, 4 and 5. A dialogue box 217 shows an example of a further embodiment of the interface module 9E where information is entered into a field of record $11_n$. The dialogue box 217, for example, demonstrates the user selecting the appropriate asset 183 associated with the record and by this action the program sets up an automatic scheduler 218, that can be used, for example, to alert the user to periodically obtain new financial statements from the borrower as required by the loan agreement. The system can further create individual tracking records for each asset document entered.

Figure 13:
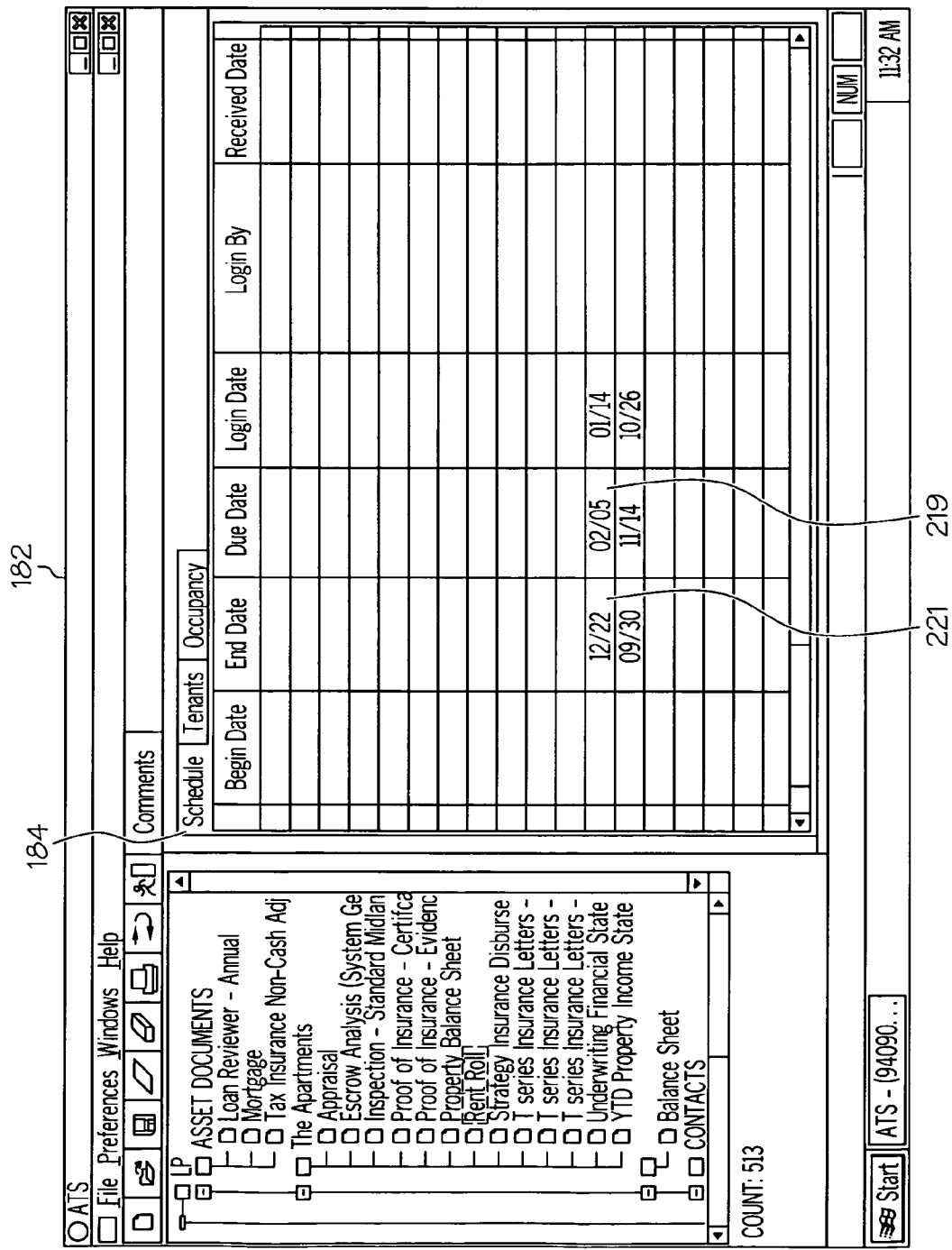
FIG. 13 is an example of a graphical user interface of one embodiment showing details of one of the fields shown in FIG. 12A.

FIG. 13 is an example of a graphical user interface of one embodiment showing details of one of the fields shown in FIG. 12A. This split screen 184 is displayed based upon the user selection in dialogue box 217 as shown in FIG. 12A and is an example of one embodiment of the database interface module 9E shown in FIGS. 3, 4 and 5. In this example of a split screen 184, a due date for document collection 219 is established and if the user currently has the asset document an end date 221 is entered. This functionality of the interface screen 182 facilitates orderly document collection and allows the user to enter the documents as they become available on a flow basis over time instead of entering all of them just prior to loan securitization.

Figure 14:
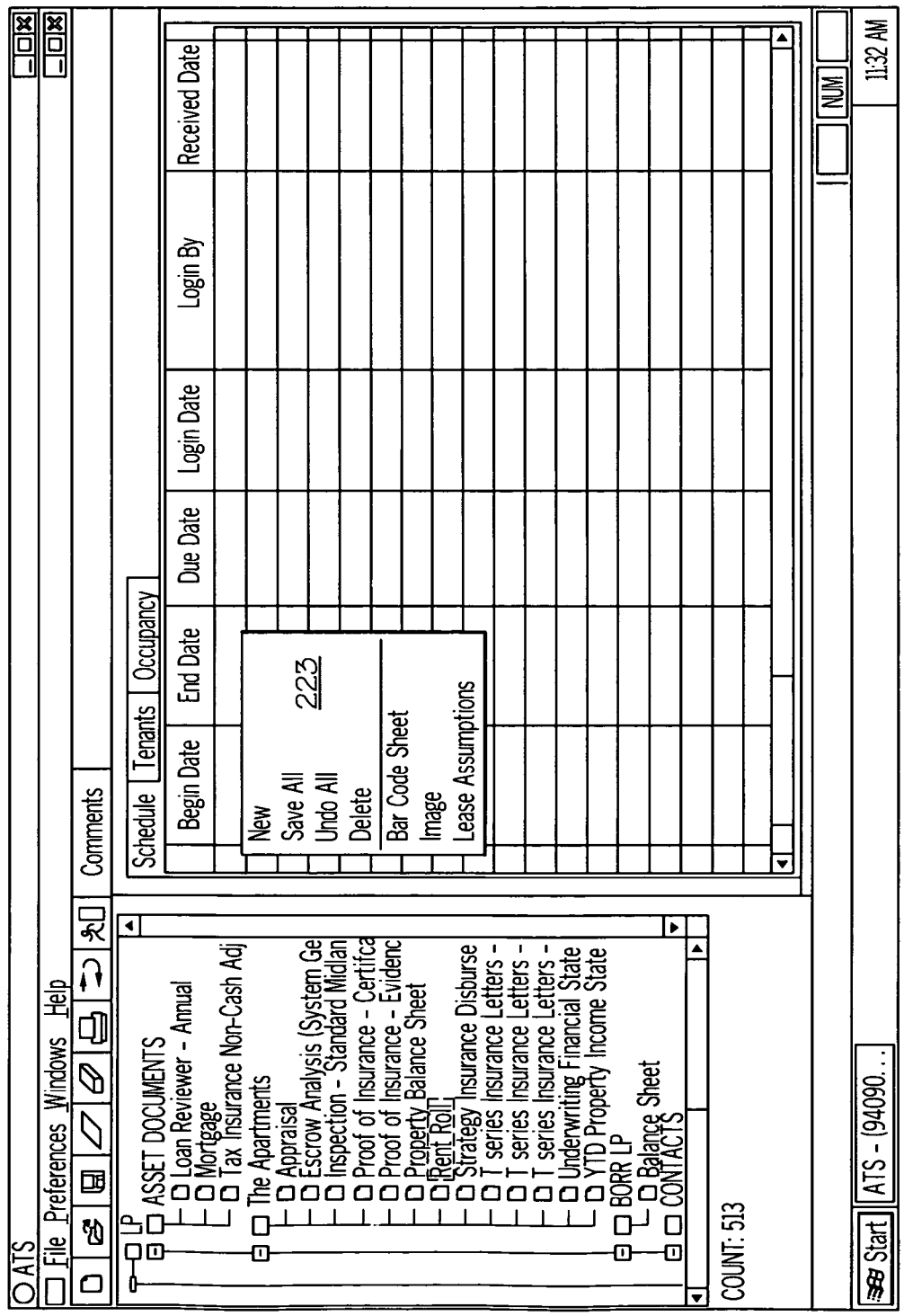
FIG. 14 is an example of a graphical user interface used in the entry of data and generation of markers for asset documents in one embodiment.
Figure 15:
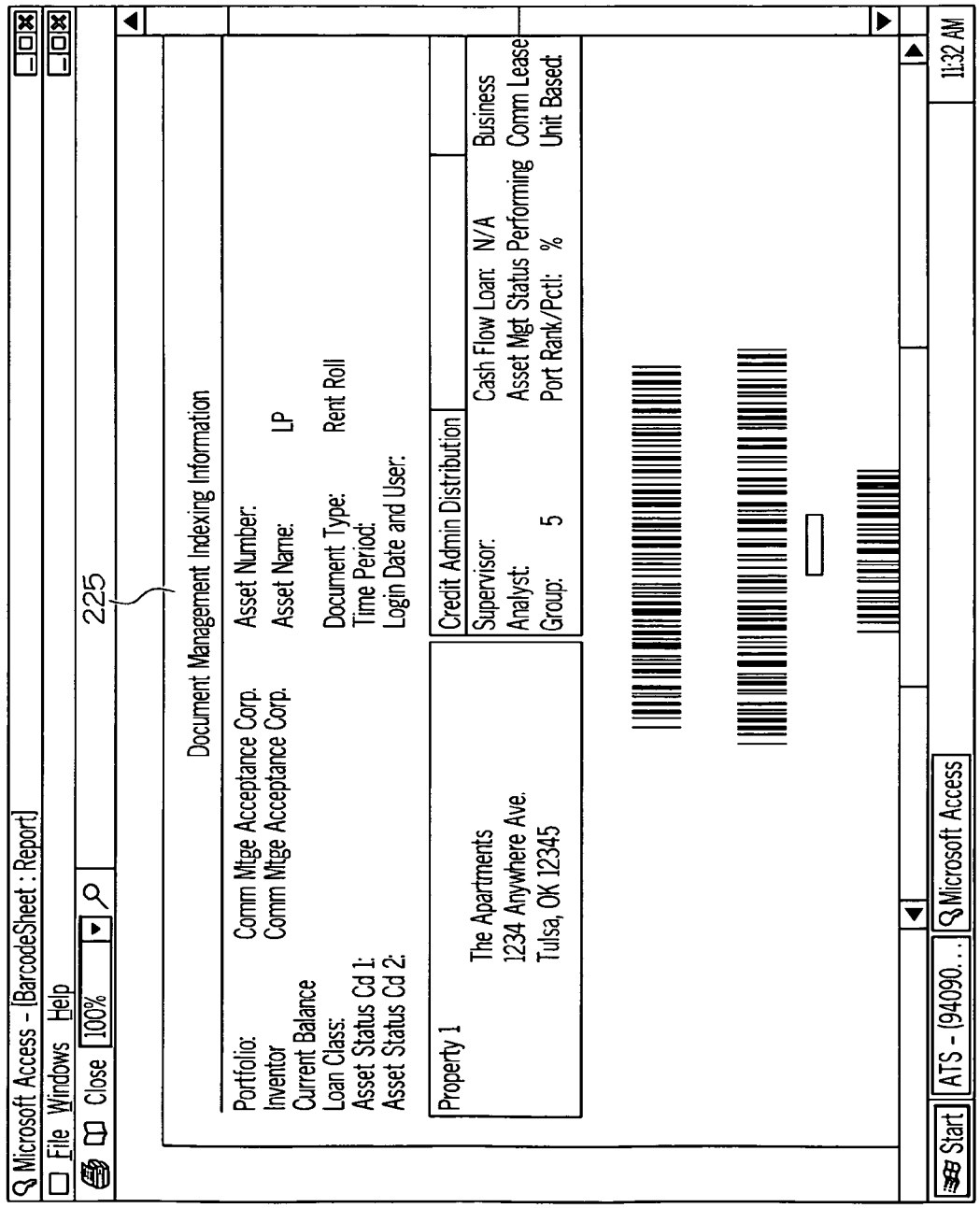
FIG. 15 is an example of an output from a user selection from the graphical user interface shown in FIG. 14.

FIG. 14 is an example of a graphical user interface used in the entry of data and generation of markers for asset documents in one embodiment. The program displays a pop-up window 223 that facilitates scanning of the asset document to create an electronic facsimile for entry into the database 13. The pop-up window 223 further enables a user to create a bar code sheet or unique identification marker to affix to an asset document. In the embodiment displayed in FIG. 14, the user selects bar code sheet and the program produces a unique marker document 225, as shown in FIG. 15, containing an identification marker that is affixed to the document prior to scanning. In this embodiment, the system facilitates tracking of documents via optical means after the unique marker document 225 is affixed to the asset document.

Figure 16:
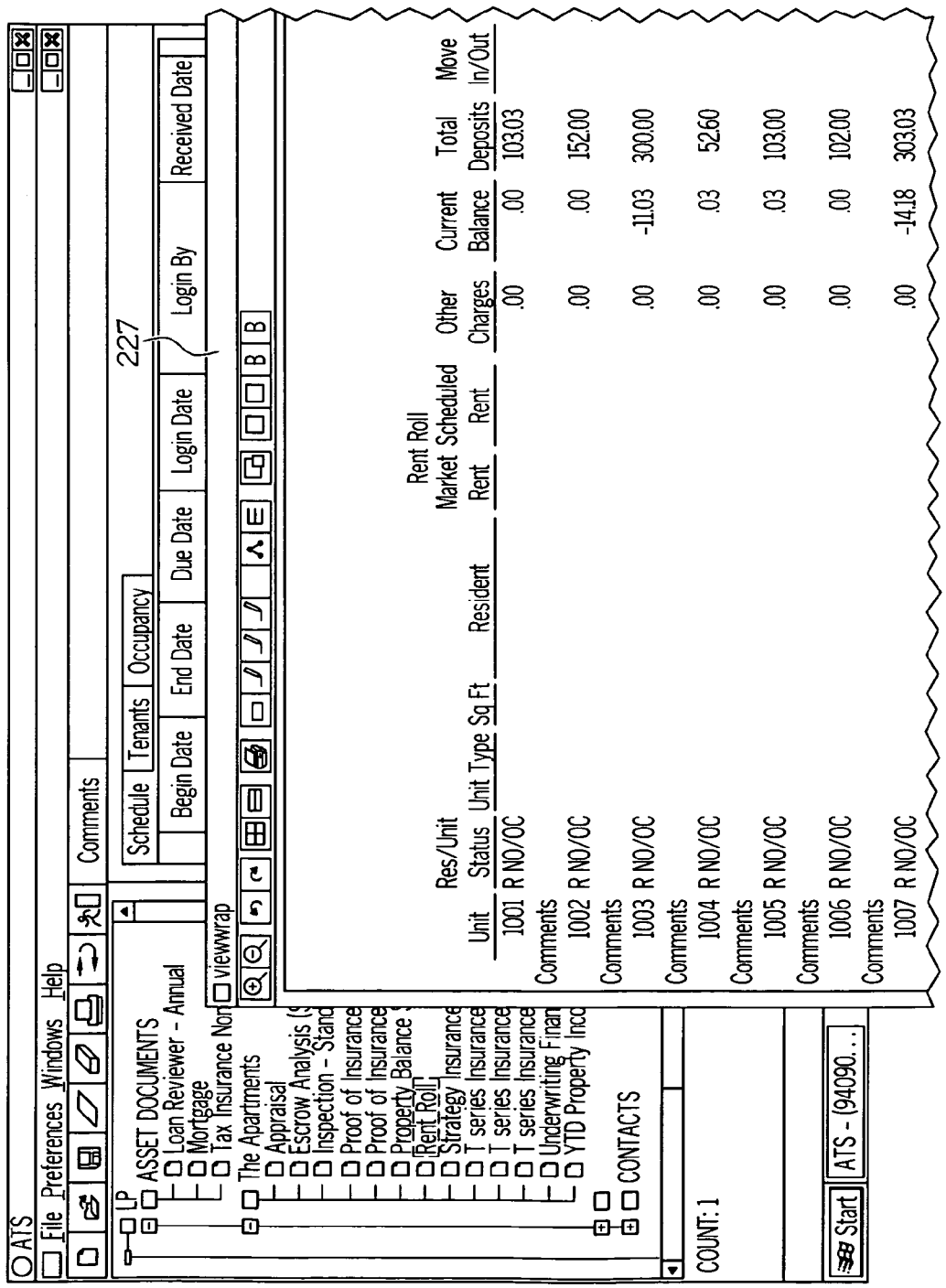
FIG. 16 is an example of a graphical user interface used for viewing an electronic facsimile of an asset document scanned into the database.

FIG. 16 is a graphical user interface for viewing an electronic facsimile of an asset document scanned into the database. The dialogue box 223, as shown in FIG. 14, allows a user to view an electronic facsimile of an asset document 227 after the document is scanned into the system. It is appreciated from the screen view 182 and further from the directory tree 185 that any image stored for a given field of record $11_1$-$11_n$ is capable of viewing via dialogue box 223. A user selects an asset 183 causing a directory tree 185 for that asset to display. The user then causes the dialogue box 223 to display and selects image to view the asset document associated with that field in the record $11_1$-$11_n$ associated with asset 183.

Figure 17:
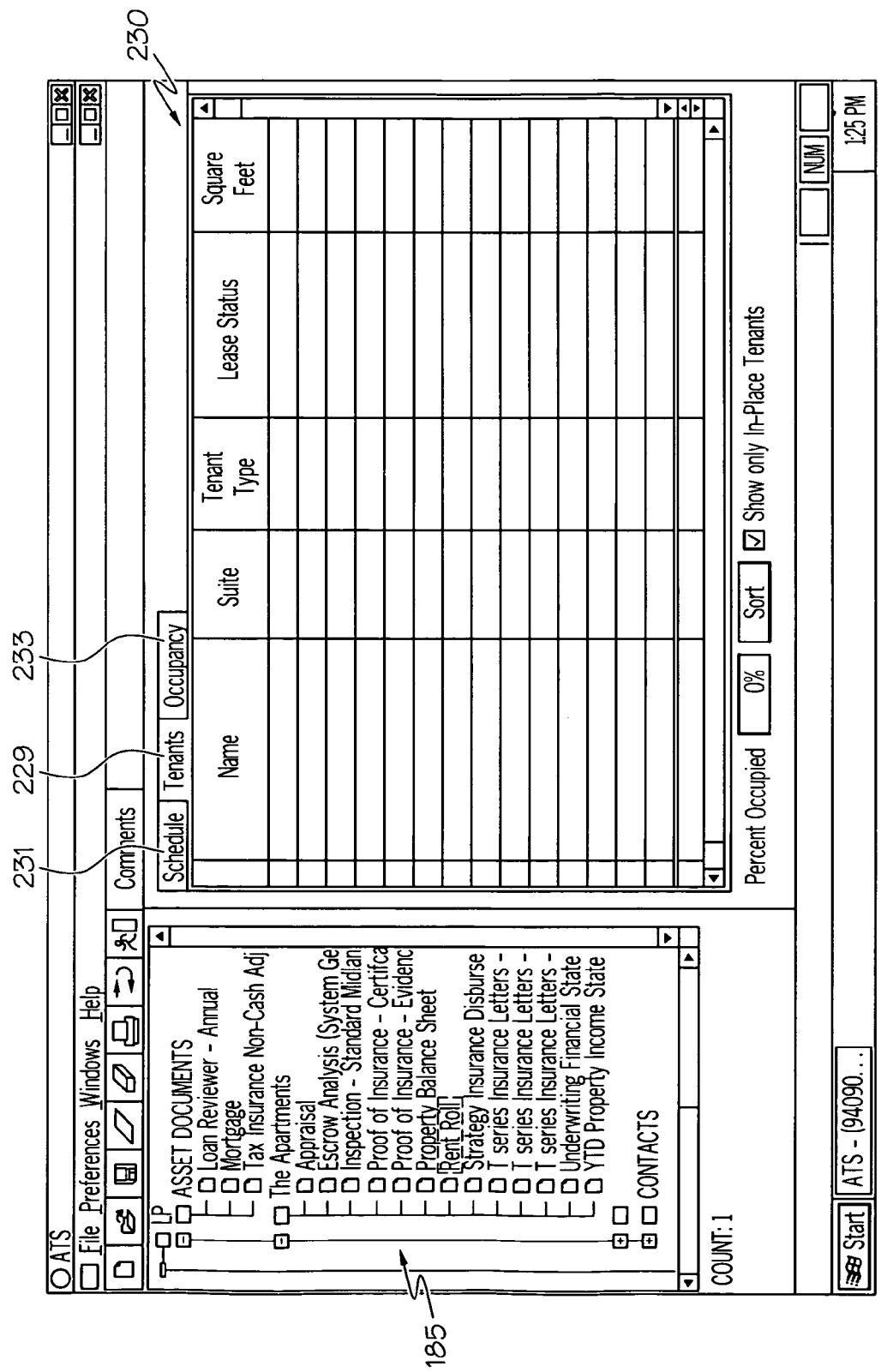
FIG. 17 is an example of a graphical user interface template used in one embodiment of the system for entering asset document information into the database.

FIG. 17 is an example of a graphical user interface template used in one embodiment of the system for entering asset document information into the database 13. To efficiently enter asset data into the database 13 and to properly analyze the contents of the asset data, in one embodiment, the system provides templates 230 for a document type selected from the directory tree 185. The template 230, in this example, serves a dual purpose as a database interface and data analyzer. Upon selection of a field associated with an asset document type from the tree 185, the system displays subfields commonly found in that type of asset document. These subfields, for example subfields 229, 231 and 233, require pertinent data to service and sell the loan into a trust or SPV, for securitization.

Figure 18:
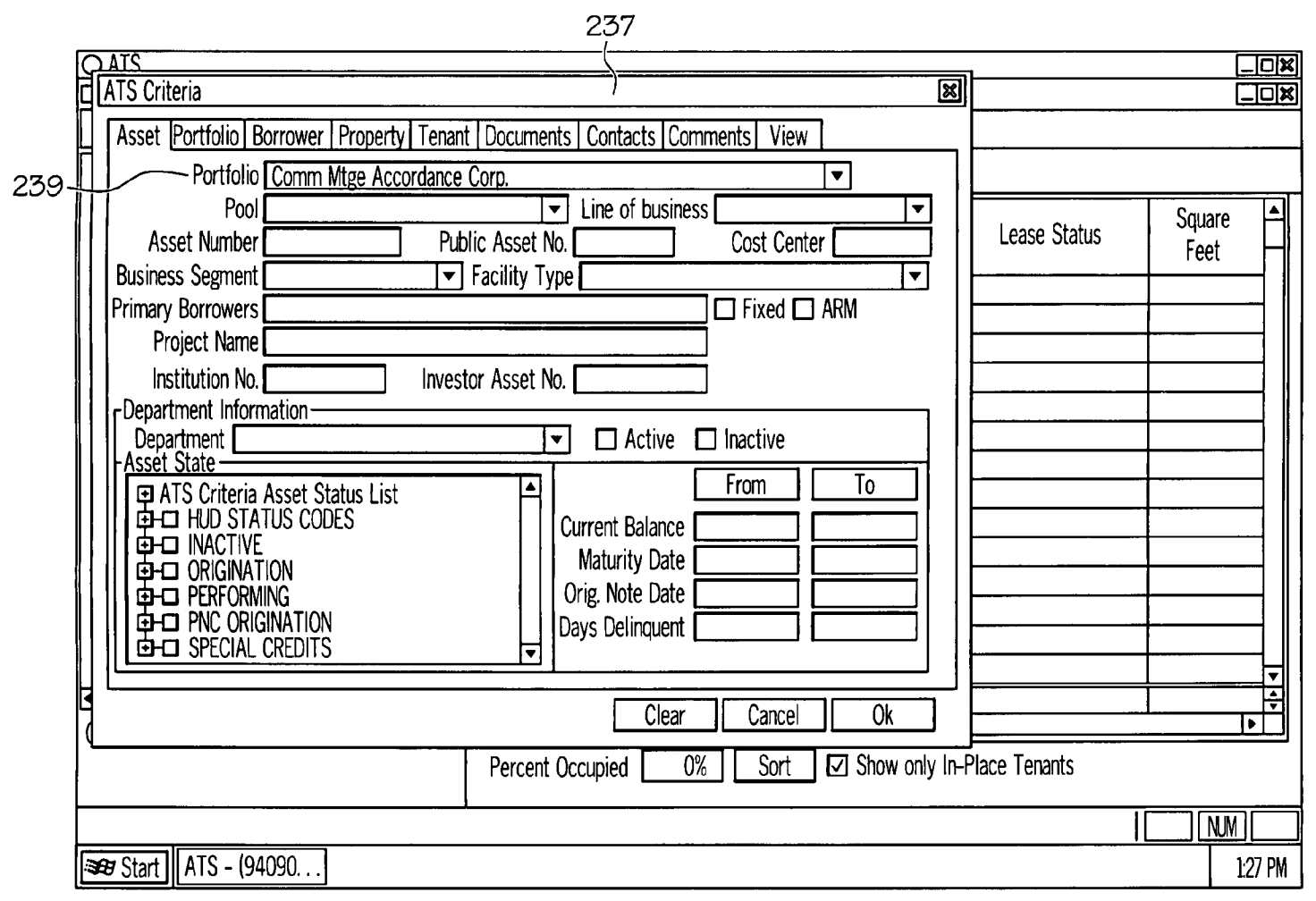

FIG. 18 is an example of a graphical user interface for selecting a loan portfolio or set of loans to produce a report or datafile. The user causes dialogue box 237 to display. In one embodiment, the dialogue box 237 accepts user input 239 and causes a module to execute that aggregates data in accordance with user input 239. In one embodiment, for example, the user requests data derived from source asset documents contained in a series of assets (records $11_1$-$11_n$), for example, all loan terms and property values for a collection of assets. The program, utilizing the compilation module 59 as shown in FIG. 5, generates a datafile that presents loan terms as stated in each promissory note and property values stated in each appraisal.

Figure 19:
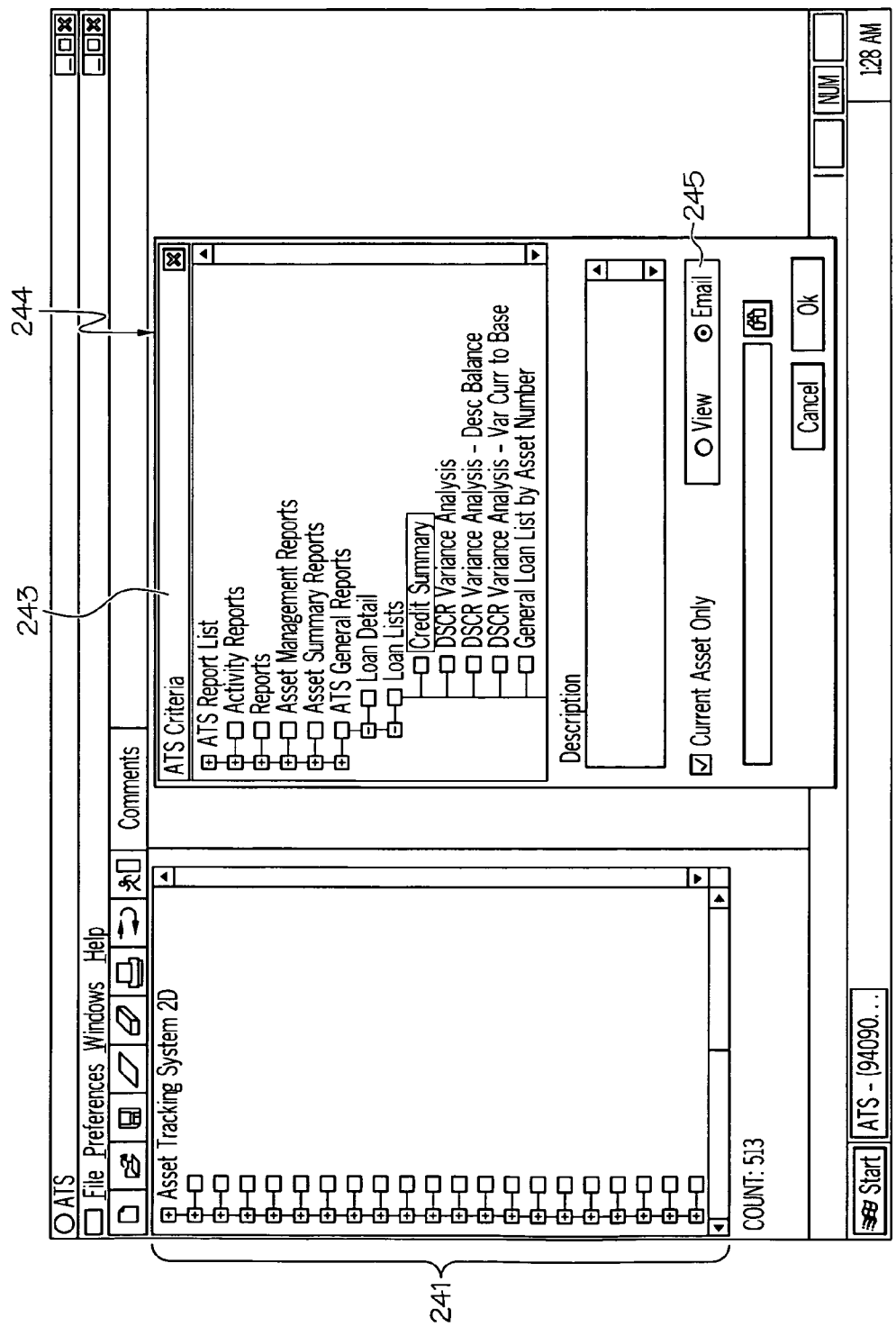
FIG. 19 is an example of a graphical user interface for selecting a report from a user selection shown in FIG. 18.

FIG. 19 is an example of a graphical user interface for selecting a report from a user selection shown in FIG. 18. The datafile produced in FIG. 18 is presented to the user in a dialogue box 243 and contains a series of preprogrammed reports 244. The user has the option of viewing a report from the list 244, sending the report via e-mail 245 or printing the report. The directory tree 241 comprises a list of assets, each asset corresponding to a record $11_1$-$11_n$ in the database 13.

Figure 20:
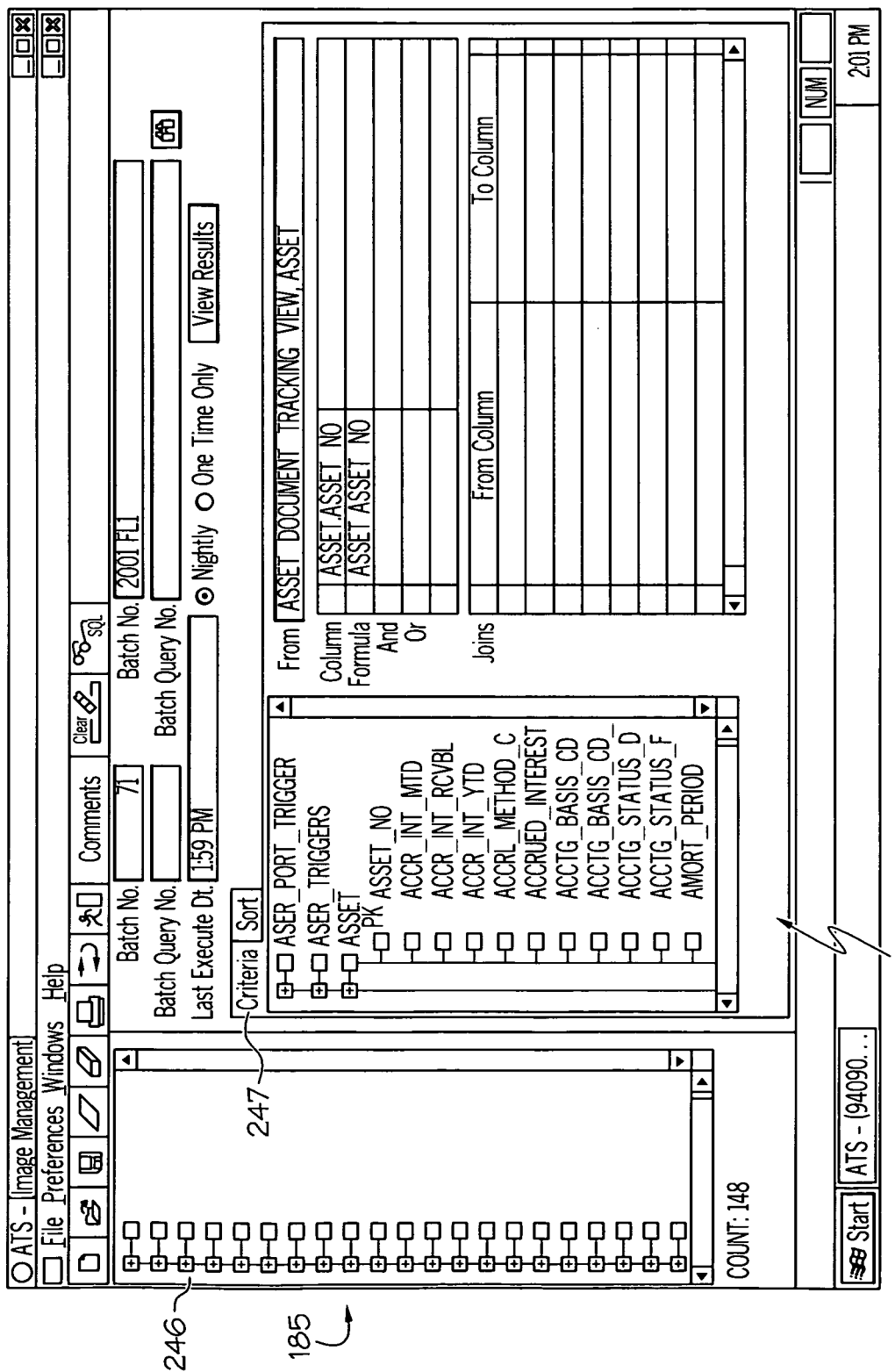
FIG. 20 is an example of a graphical user interface for creating and storing criteria used in retrieval of electronic facsimiles of asset documents stored in the database.

FIG. 20 is an example of a graphical user interface for creating and storing criteria used in retrieval of electronic facsimiles of asset documents stored in the database 13. The user selects a loan portfolio 246 from a directory tree 185. The user can cause a criteria template 248 to display where the user enters the criteria that are, in turn, used in retrieving the electronic facsimiles of asset documents. The information format and extraction module 45 of the extraction module 19 is utilized to complete the electronic facsimile retrieval process.

Figure 21:
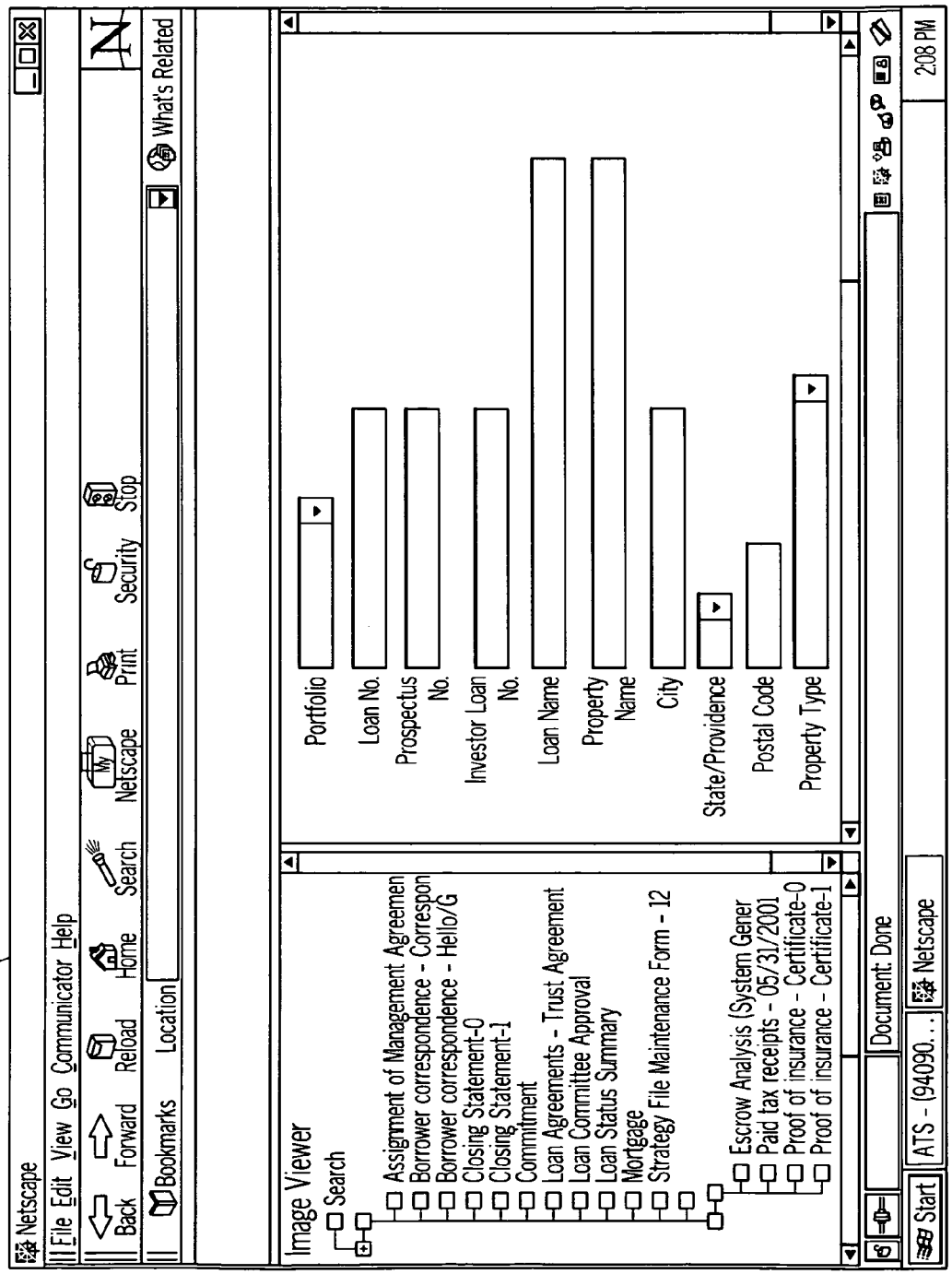
FIG. 21 is an example of a graphical user interface of an indexing scheme created by the system for the electronic facsimiles retrieved as shown in FIG. 20.

FIG. 21 is an example of a graphical user interface of an indexing scheme created by the system for the electronic facsimiles retrieved as shown in FIG. 20. Screen 250 is displayed after the retrieval of electronic facsimiles of asset documents shown in FIG. 20. A directory tree 249 is displayed showing an indexed list in hierarchical form, created by the extraction module 19, of all electronic facsimiles of asset documents meeting the criteria entered as shown in FIG. 20. The list 249 is then transferred to a CD via a conventional CD creation method or the list is saved as a webpage where access is granted to authorized remote users as shown in FIG. 11.

Figure 22:
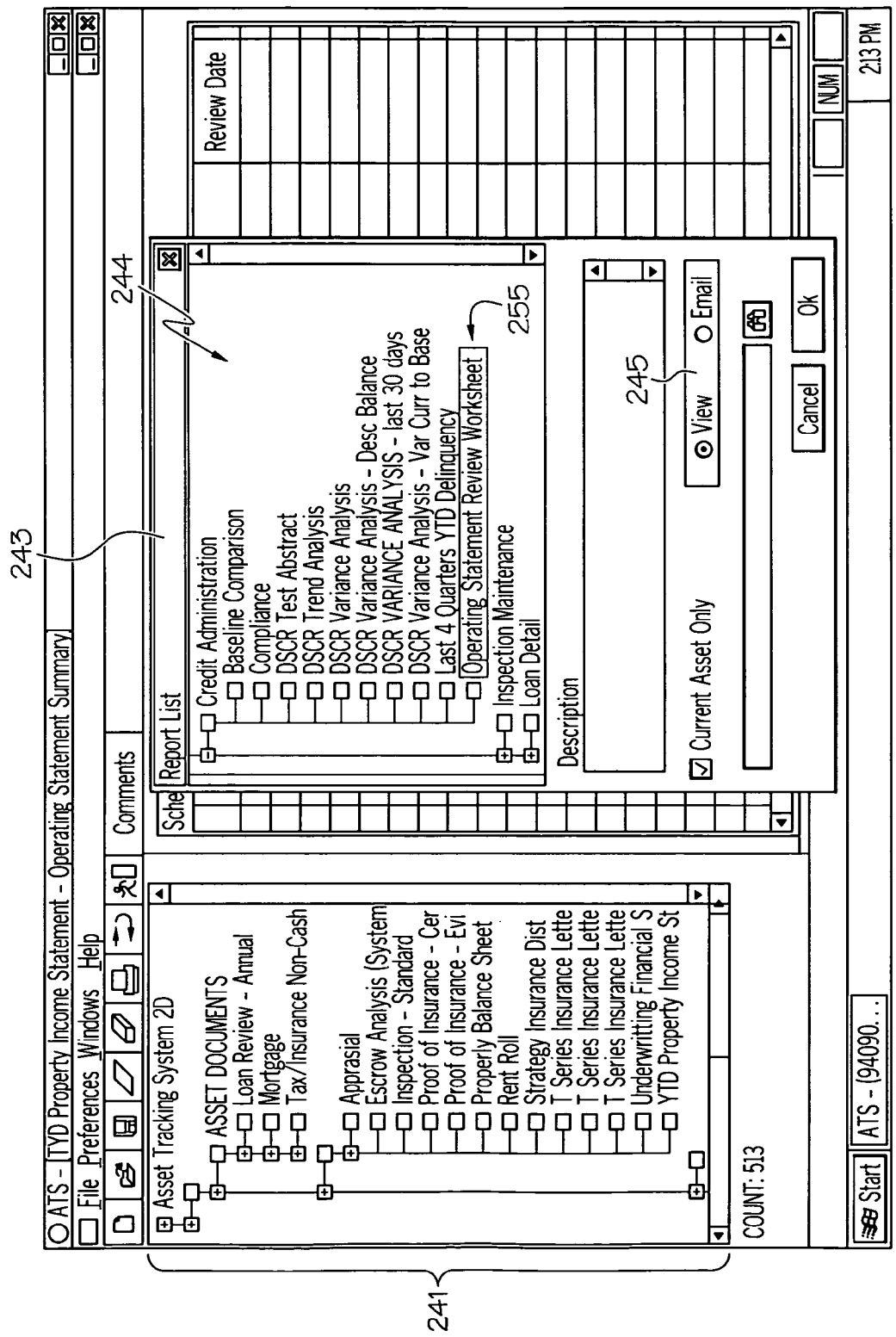
FIG. 22 is an example of a graphical user interface for selecting report templates created from the asset data stored in the database.

FIG. 22 is an example of a graphical user interface for selecting report templates created from the asset data stored in the database for the purpose of data extraction. This is the dialogue box demonstrated in FIG. 19 and is an example of a graphical user interface for generating a report from a user selection shown in FIG. 18. The datafile produced in FIG. 18 is presented to the user in a dialogue box 243 and contains a series of preprogrammed reports 244. In this example, the user selects "view" 245 and further selects a report 255 from the list 244.

Figure 23:
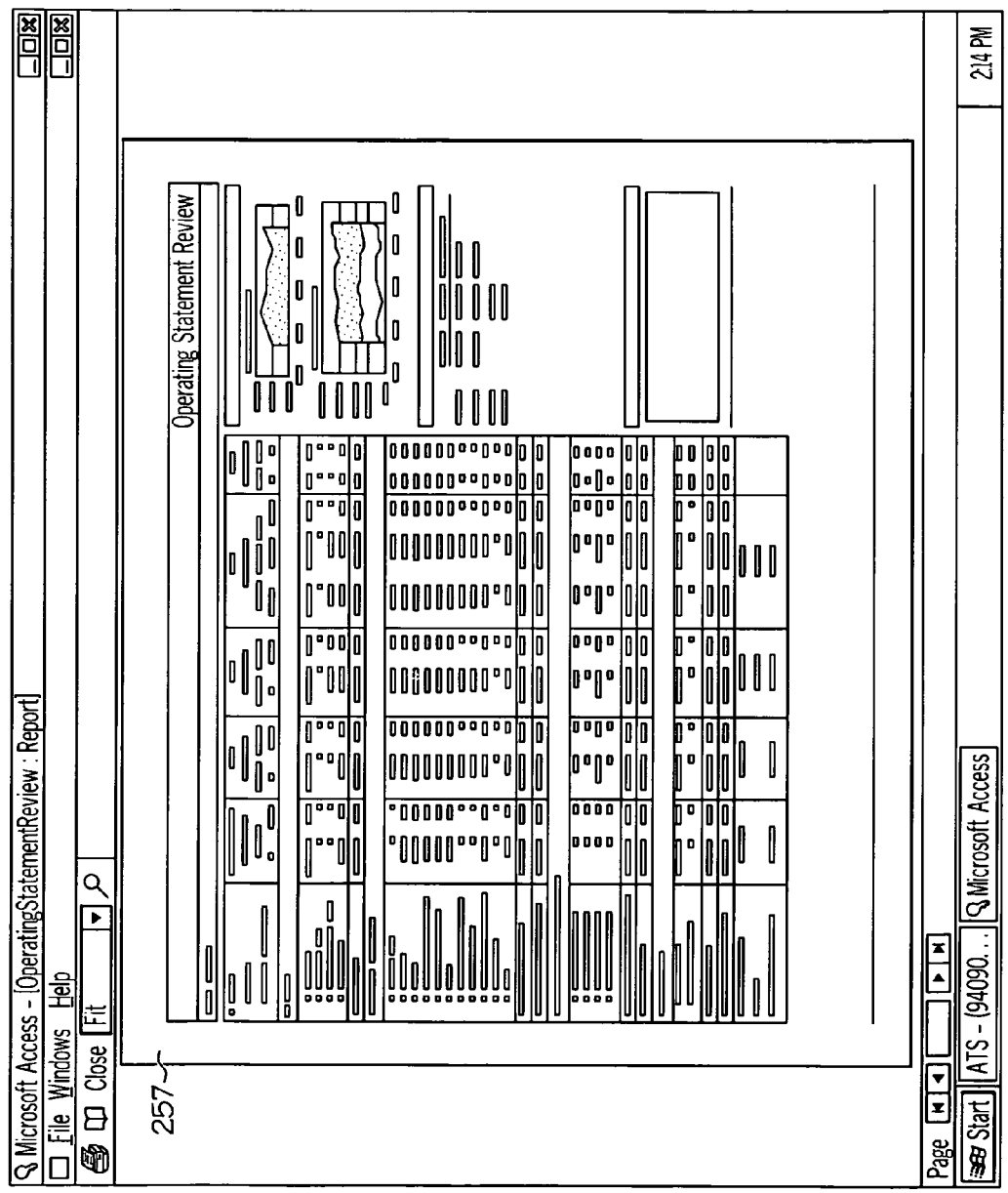
FIG. 23 is an example of a report generated from a selection shown in FIG. 22.

FIG. 23 is an example of a report generated from a selection shown in FIG. 22. A report 257 is created based upon the user's selection from the dialogue box 243 shown in FIG. 22. The user further has the option of printing a physical copy of the report or sending a copy via electronic mail.

From the foregoing, it is apparent that the methods and systems discussed herein allow a lender to efficiently accumulate data efficiently on a flow basis—near real time as the asset documents become available to the loan originator or another party concerned with loan maintenance—over the course of time so that the data is readily available and substantially reliable at the time of securitization. The systems and methods further provide that when a loan is originated, substantially all available documents are entered into the system, and the system, in turn, determines if the data meets applicable banking standards for securitization. The methods and systems further flow information into the database in near real time and provide a method to promote data integrity. Such methods and systems reduce due diligence on the lender's behalf in comparison to industry averages, and improve the integrity of the collected data. Such methods and systems allow the lender to concentrate efforts on effecting the transaction and attending to investor needs, rather than expending costly resources on simply attempting to collect, organize and process data.

The systems and methods further provide rigorous collection of loan documentation before a loan is sold into a trust or SPV for securitization. In accordance with the method described, this rigorous collection occurs on a flow basis—in near real time as the documents pertaining to the loan become available to those concerned with loan origination and maintenance.

Finally, the systems and methods validate information taken from a plurality of asset documents against applicable standards in near real time as the loan documents become available to those concerned with loan origination, maintenance and securitization, thereby reducing or eliminating costly due diligence prior to securitization.

The term "computer readable medium" is defined herein as understood by those skilled in the art. A computer readable medium can include, for example, memory devices such as diskettes, compact discs of both read-only and writeable varieties, optical disk drives, and hard disk drives. A computer readable medium can also include memory storage that can be physical, virtual, permanent, temporary, semi-permanent and/or semi-temporary. A computer readable medium can further include one or more data signals transmitted on one or more carrier waves.

It can be appreciated that, in some embodiments of the present methods and systems disclosed herein, a single component can be replaced by multiple components, and multiple components replaced by a single component, to perform a given function. Except where such substitution would not be operative to practice the present methods and systems, such substitution is within the scope of the present invention.

Examples presented herein are intended to illustrate potential implementations of the present method and system embodiments. It can be appreciated that such examples are intended primarily for purposes of illustration. No particular aspect or aspects of the example method and system embodiments, described herein are intended to limit the scope of the present invention. One skilled in the art would readily recognize that the present systems and methods have uses outside the commercial loan arena and none of the embodiments presented above are meant to limit the scope of applications of the present methods and systems.

What is claimed is:

1. A computer-assisted method for processing documents in a database having at least one record therein, the method comprising:
receiving, by a computer system, a document file comprising asset data stored therein in preparation for securitization of multiple assets, wherein at least one of the multiple assets comprises an issued commercial mortgage loan, wherein the commercial mortgage loan is ready for securitization;

transmitting, by the computer system, the document file into the database on a near real time basis as the asset data stored in the document file becomes available for entry into the database;

receiving, by the computer system, preexisting asset data generated by a first party to the commercial mortgage loan, wherein the asset data stored in the document file is generated by a second party to the commercial mortgage loan, wherein the first party and the second party are distinct, and wherein at least one of the preexisting asset data generated by the first party and the asset data comprised by the document file generated by the second party reflects a physical inspection of a property covered by the issued commercial mortgage loan;

inventorying the document file into an associated record in the database on a near real time basis as the asset data in the document file becomes available for inventorying, including collecting asset data from the document file independently of an end use of the document file;

when the asset data stored in the document file relates to preexisting asset data contained within the at least one record stored in the database, comparing, by the computer system, the asset data stored in the document file to the preexisting asset data contained in the at least one record;

generating a data mismatch alert, by the computer system, when the asset data stored in the document file does not match the preexisting asset data contained in the at least one record;

providing, by the computer system, the data mismatch alert to a user of the computer system via a user interface;

analyzing, by the computer system, the asset data stored in the document file in near real time as the asset data become available to determine compliance with at least one preprogrammed banking rule for securitizing multiple financial instruments;

generating a banking rule alert, by the computer system, when the contents of the document file do not comply with the at least one preprogrammed banking rule for securitizing multiple financial instruments;

providing, by the computer system, the banking rule alert to the user of the computer system via the user interface; and providing, by the computer system, specific output data from the at least one record in the database to a user on demand, wherein the output data includes asset data related to the multiple assets pertaining to a securitization of the multiple assets.

2. The method of claim 1, wherein the providing step comprises:
requesting specific information contained in the document file;
locating a record associated with the document file;
retrieving the record; and
extracting the specific information contained in the record.

3. The method of claim 1, wherein each of the multiple assets comprise a commercial mortgage loan that is ready to be prepared for securitization.

4. The method of claim 1, wherein generating the banking standard alert comprises generating the banking standard alert in real time as the document file is transmitted in to the database.

5. A computer system for automated processing of documents in a database having at least one record therein, the system comprising:
a data input device to receive first information stored in an asset document file related to an asset from an input source on a flow basis including to receive the first information as the first information becomes available for entry, wherein information from a plurality of the asset document files related to the asset comprises a record;
a storage device for storing the record;
a processor in communication with at least one computer readable memory including stored computer executable instructions that, when executed by the processor, cause the processor to:
receive in at least one document file comprising asset data stored therein in preparation for securitization of multiple assets, wherein at least one of the multiple assets comprises an issued commercial mortgage loan, wherein the commercial mortgage loan is ready for securitization;
receive preexisting asset data generated by a first party to the commercial mortgage loan, wherein the asset data stored in the document file is generated by a second party to the commercial mortgage loan, wherein the first party and the second party are distinct, and wherein at least one of the preexisting asset data generated by the first party and the asset data comprised by the document file generated by the second party reflects a physical inspection of a property covered by the issued commercial mortgage loan;
transmit the document file into the database on a near real time basis as the asset data stored in the document file becomes available for entry into the database;
inventory the document file into an associated record in the database on a flow basis as the asset data in the document file becomes available for inventorying, including collecting asset data from the document file independently of an end use of the document file;
when the asset data stored in the document file relates to preexisting asset data contained within the at least one record stored in the database, compare the asset data stored in the document file to the preexisting asset data contained in the at least one record;
generate a data mismatch alert when the asset data stored in the document file does not match the preexisting asset data contained in the at least one record;
provide the data mismatch alert to a user of the computer system via a user interface;
analyze the asset data stored in the document file in near real time as the asset data become available to determine compliance with at least one preprogrammed banking rule for securitizing multiple financial instruments;
generate a banking rule alert when the contents of the document file do not comply with the at least one preprogrammed banking rule for securitizing multiple financial instruments;
provide the banking rule alert to the user of the computer system via the user interface; and
provide specific output data from the at least one record in the database to a user on demand, wherein the output data includes asset data related to the multiple assets pertaining to a securitization of the multiple assets.

6. The system of claim 5, wherein the processor is configured to:
request specific information contained in the document file;
locate a record associated with the document file;
retrieve the record; and
extract the specific information contained in the record.

7. The system of claim 5, wherein the stored instructions, when executed by the processor, cause the processor to generate the banking standard alert in real time as the document file is transmitted in to the database.

8. An apparatus, comprising:
a computer readable memory;
the computer readable memory including stored computer executable instructions that, when executed by a processor, cause the processor to:
receive in at least one document file comprising asset data stored therein in preparation for securitization of multiple assets, wherein at least one of the multiple assets comprises an issued commercial mortgage loan, wherein the commercial mortgage loan is ready for securitization;
transmit the document file into the database on a near real time basis as the asset data stored in the document file becomes available for entry into the database;
receive preexisting asset data generated by a first party to the commercial mortgage loan, wherein the asset data stored in the document file is generated by a second party to the commercial mortgage loan, wherein the first party and the second party are distinct, and wherein at least one of the preexisting asset data generated by the first party and the asset data comprised by the document file generated by the second party reflects a physical inspection of a property covered by the issued commercial mortgage loan;
inventory the document file into an associated record in the database on a near real time basis as the asset data in the document file becomes available for inventorying, including collecting asset data from the document file independently of an end use of the document file;
when the asset data stored in the document file relates to preexisting asset data contained within the at least one record stored in the database, compare the asset data stored in the document file to the preexisting asset data contained in the at least one record;
generate a data mismatch alert when the asset data stored in the document file does not match the preexisting asset data contained in the at least one record;
provide the data mismatch alert to a user of the apparatus via a user interface;
analyze the asset data stored in the document file in near real time as the asset data become available to determine compliance with at least one preprogrammed banking rule for securitizing multiple financial instruments;
generate a banking rule alert when the contents of the document file do not comply with the at least one preprogrammed banking rule for securitizing multiple financial instruments;
provide the banking rule alert to the user of the apparatus via the user interface; and
provide specific output data from the at least one record in the database to a user on demand, wherein the output data includes asset data related to the multiple assets pertaining to a securitization of the multiple assets.

9. The apparatus of claim 8, wherein the stored instructions, when executed by the processor, further cause the processor to:
request specific information contained in the document file;
locate a record associated with the document file;
retrieve the record; and
extract the specific information contained in the record.

10. The apparatus of claim 8, wherein the stored instructions, when executed by the processor, further cause the processor to generate the banking standard alert in real time as the document file is transmitted in to the database.

11. An apparatus, comprising:
a computer readable memory storage;
the computer readable memory storage including stored computer executable instructions that, when executed by a processor, cause the processor to:
receive in at least one document file comprising asset data stored therein in preparation for securitization of multiple assets, wherein at least one of the multiple assets comprises an issued commercial mortgage loan, wherein the commercial mortgage loan is ready for securitization;
transmit the document file into the database on a near real time basis as the asset data stored in the document file becomes available for entry into the database;
receive preexisting asset data generated by a first party to the commercial mortgage loan, wherein the asset data stored in the document file is generated by a second party to the commercial mortgage loan, wherein the first party and the second party are distinct, and wherein at least one of the preexisting asset data generated by the first party and the asset data comprised by the document file generated by the second party reflects a physical inspection of a property covered by the issued commercial mortgage loan;
inventory the document file into an associated record in the database on a near real time basis as the asset data in the document file becomes available for inventorying, including collecting asset data from the document file independently of an end use of the document file;
when the asset data stored in the document file relates to preexisting asset data contained within the at least one record stored in the database, compare the asset data stored in the document file to the preexisting asset data contained in the at least one record;
generate a data mismatch alert when the asset data stored in the document file does not match the preexisting asset data contained in the at least one record;
provide the data mismatch alert to a user of the apparatus via a user interface;
analyze the asset data stored in the document file in near real time as the asset data become available to determine compliance with at least one preprogrammed banking rule for securitizing multiple financial instruments;
generate a banking rule alert when the contents of the document file do not comply with the at least one preprogrammed banking rule for securitizing multiple financial instruments;
provide the banking rule alert to the user of the apparatus via the user interface; and
provide specific output data from the at least one record in the database to a user on demand, wherein the output data includes asset data related to the multiple assets pertaining to a securitization of the multiple assets.

12. The apparatus of claim 11, wherein the stored instructions, when executed by a processor, further cause the processor to:
   request specific information contained in the document file;
   locate a record associated with the document file;
   retrieve the record; and
   extract the specific information contained in the record.

13. The apparatus of claim 11, wherein the stored instructions, when executed by a processor, further cause the processor to generate the banking standard alert in real time as the document file is transmitted in to the database.

* * * * *